United States Patent [19]
Denny et al.

[11] Patent Number: 5,724,261
[45] Date of Patent: Mar. 3, 1998

[54] DATA PROCESSING SYSTEM AND METHOD FOR COMPILING DATA DURING PROPERTY INSPECTION AND MAINTENANCE OPERATIONS

[75] Inventors: Joseph Paul Denny, Greer, S.C.; Edward Wallace Sternagle; Kenneth Scott Allman, both of Charlotte, N.C.

[73] Assignee: Rent Roll, Inc., Carrollton, Tex.

[21] Appl. No.: 596,640

[22] Filed: Feb. 5, 1996

[51] Int. Cl.$^6$ ............................. G06F 15/46; G06F 15/21
[52] U.S. Cl. ................. 364/550; 364/709.12; 364/555; 364/709.14; 364/188; 235/375; 235/376
[58] Field of Search ................ 364/550, 709.12, 364/555, 402, 403, 709.14, 188, 507, 401 R; 235/375, 376

[56] References Cited

U.S. PATENT DOCUMENTS

| | | | |
|---|---|---|---|
| 4,125,111 | 11/1978 | Hudspeth et al. | 128/2.05 T |
| 4,970,672 | 11/1990 | Snodgrass | 364/709.12 |
| 5,136,285 | 8/1992 | Okuyama | 340/870.11 |
| 5,399,844 | 3/1995 | Holland | 235/376 |
| 5,496,992 | 3/1996 | Madan et al. | 235/462 |
| 5,508,911 | 4/1996 | Vanko et al. | 364/188 |
| 5,528,518 | 6/1996 | Bradshaw et al. | 364/561 |
| 5,555,351 | 9/1996 | Craig et al. | 395/114 |
| 5,557,512 | 9/1996 | Vanko et al. | 364/188 |

OTHER PUBLICATIONS

*Easy Track Inspection System* brochure, PC Systems.
New Jersey Department of Community Affairs Section 8 Housing Quality Standards Inspection System, Cone Software, *User Documentation PAD Based.*
Joseph Lauderback, Atlantic City Pioneers Hand–held Computer Inspection System, *Firehouse*, Jul. 1994.
*Symbol PPT4100 Portable Pen Terminal With Integrated Scanner* brochure, PC Systems.
New Jersey Department of Communication Affairs Housing Inspection System developed by Cone Software, *Section 8–Housing Quality Standards Inspection System.*
*M–Track Software* brochure, M–Track Software Inc.
*Easy Track Inspection System Hardware* specification, PC Systems.

*Primary Examiner*—James P. Trammell
*Assistant Examiner*—Hien Vo
*Attorney, Agent, or Firm*—The Bell Seltzer Intellectual Property Law Group of Altson & Bird LLP

[57] ABSTRACT

The data processing system includes a property inspection data entry device for collecting and storing inspection data during the inspection of a property. The property inspection data entry device typically includes a scanner which is responsive to labels which are associated with the property as well as various items located about the property which include indicia representative of predetermined characteristics of the rental unit. The property inspection data entry device also includes a data entry device, such as a keypad, for providing manual entry of additional inspection data. The data processing system can also include a maintenance data entry device for collecting and storing maintenance data relating to maintenance activities performed on a property. The data processing system also includes a host computer for electrically communicating with the property inspection data entry device and the maintenance data entry device prior to and subsequent to inspection and maintenance activities, respectively. In particular, the inspection and maintenance data stored by the data entry devices can be transferred to the host computer following the inspection and maintenance activities. The host computer can then sort the data according to one or more predetermined parameters such that a number of customized reports and/or work orders can be generated.

40 Claims, 26 Drawing Sheets

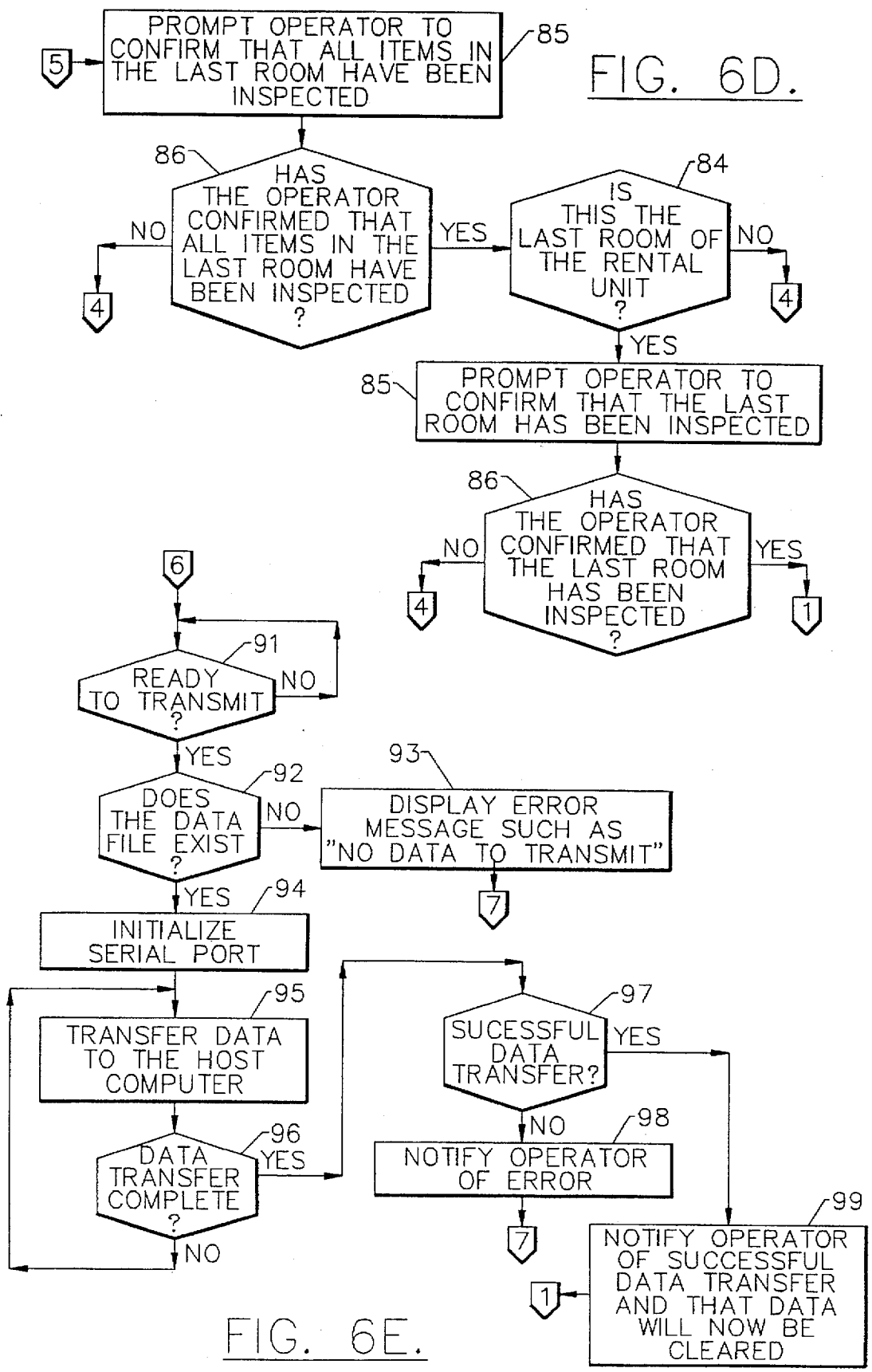

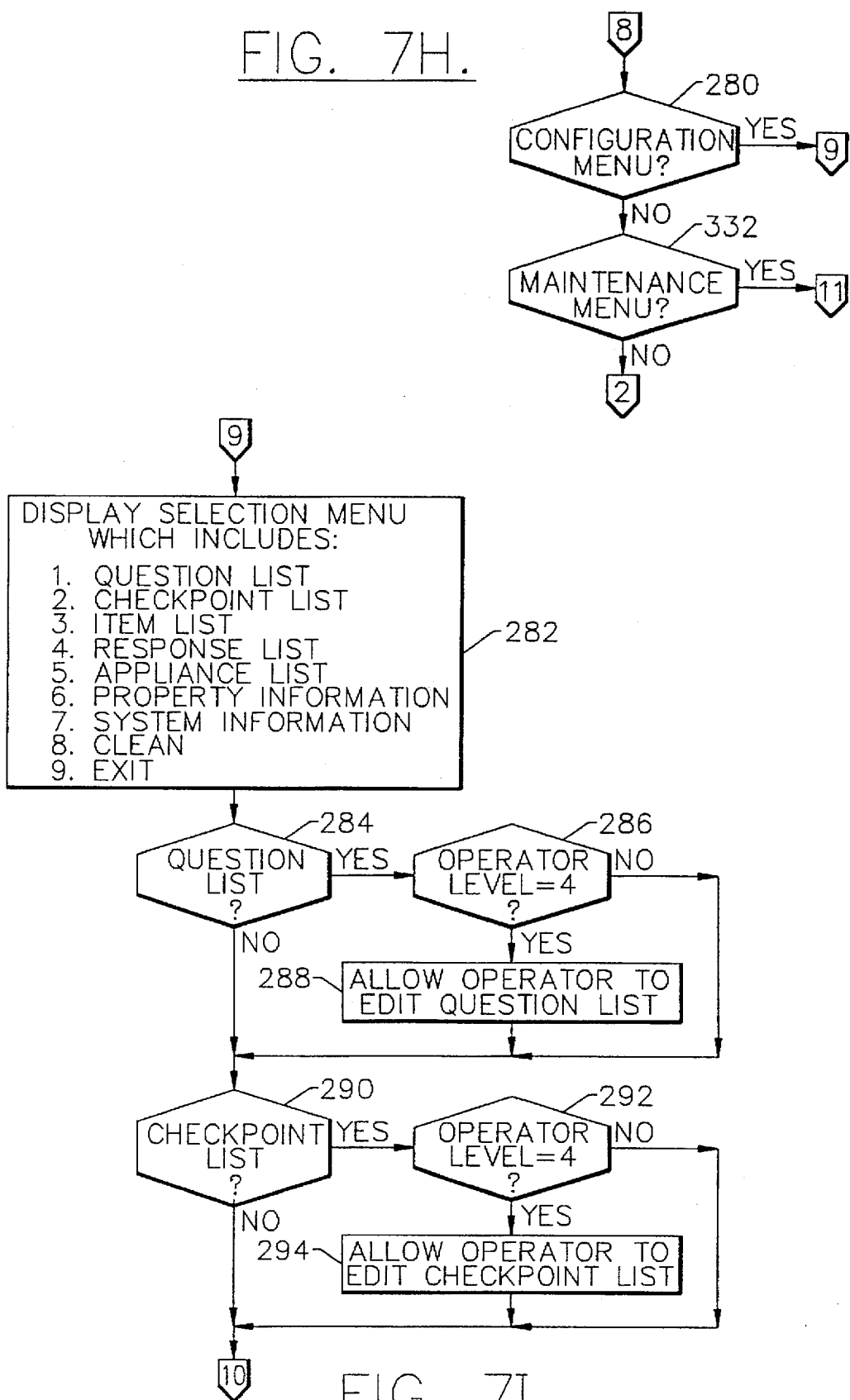

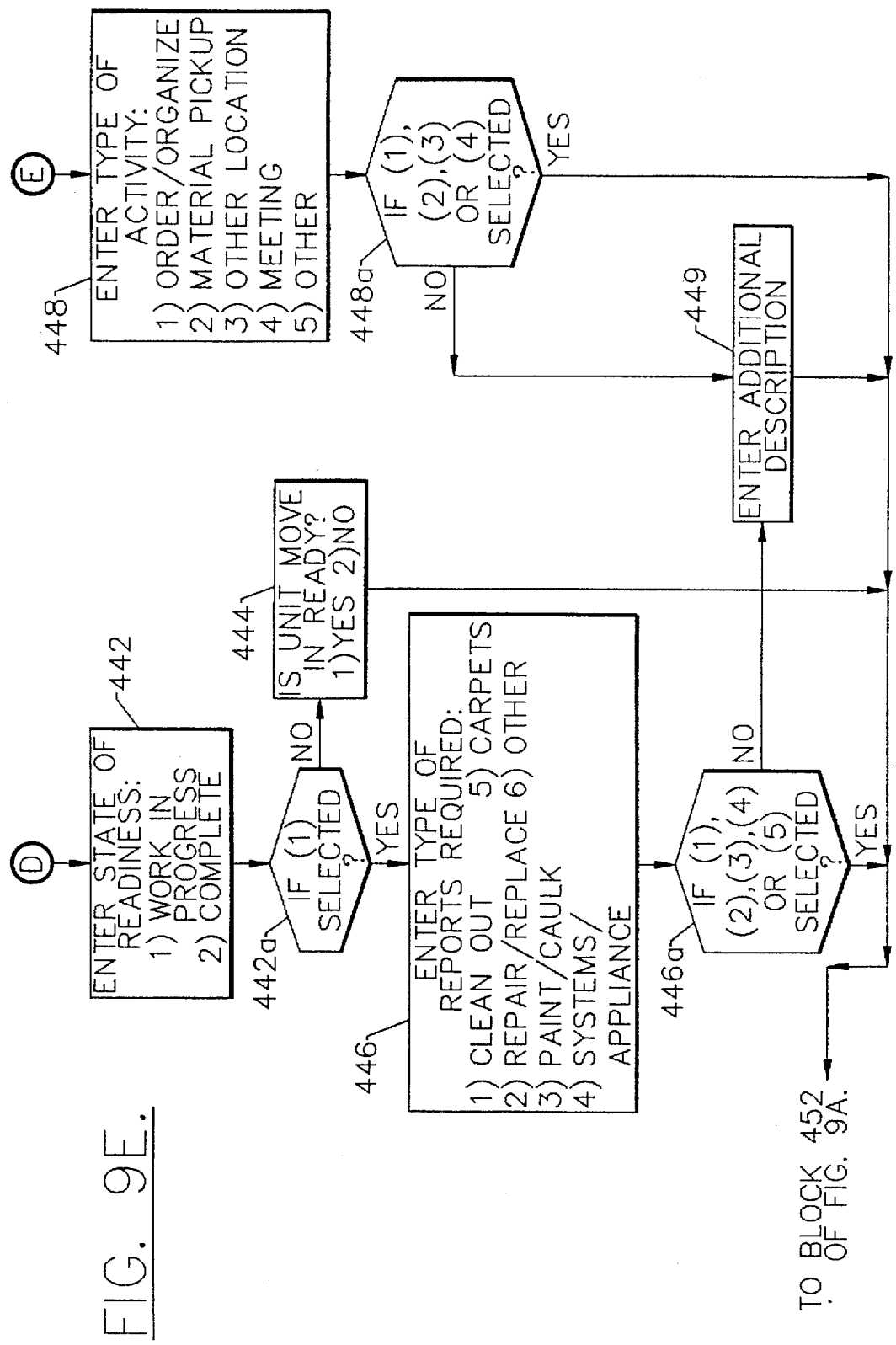

1

DATA PROCESSING SYSTEM AND METHOD FOR COMPILING DATA DURING PROPERTY INSPECTION AND MAINTENANCE OPERATIONS

FIELD OF THE INVENTION

The present invention relates generally to data processing systems and methods and, more particularly, to data processing systems and methods for compiling data during property maintenance and inspection operations.

BACKGROUND OF THE INVENTION

As evidenced by the increasing number of apartment communities and their relatively high occupancy rates, more and more people are living in apartments or other rental properties. Consequently, there is an increasing demand for management services to effectively perform the variety of managerial functions required to properly operate and maintain these rental properties. Like other industries, there is also significant competition between an increasing number of managerial companies to provide managerial services to the apartment communities and other rental properties in a timely and cost-efficient manner.

These managerial services typically include a wide variety of services, including conducting an inventory of the various assets, such as stoves, refrigerators and dishwashers, placed about the rental property. These managerial services also generally include the inspection and maintenance of the rental property, including the rental units, the common areas and the exteriors of the buildings. Accordingly, the management of most rental properties employ maintenance personnel and hire outside contractors in order to maintain and repair the rental property. As will be apparent to those skilled in the art, each of these managerial services involves the manual compilation and processing of significant quantities of data which is relatively time-consuming and can be subject to errors.

For example, the occupants of rental units move, such as to another rental unit or to a home, with some regularity. Pursuant to most rental contracts, the rental unit must be inspected either prior to the moving date of the previous occupants or at least prior to surrendering possession to the next occupant in order to identify items which need to be repaired or replaced and to properly allocate the costs for such repairs or replacements between the prior occupants and the owner of the rental property. In addition, the Housing And Urban Development (HUD) requirements as well as some rental contracts provide for the periodic inspection of the rental property even though the property may continue to be rented by the same party. Thus, one of the key managerial functions for rental properties is the periodic inspection of each rental unit.

These inspections include a detailed physical inspection of multiple items in each room of a rental unit, including the inspection of the assets contained in each rental unit, such as the refrigerator, the stove, etc. The inspections typically include not only an assessment of the presence of each item, but also an assessment of the relative condition of each item. Accordingly, items which must be repaired or replaced can be identified and the appropriate remedial action can be performed or scheduled.

This laborious inspection process has historically been conducted manually by property management personnel who complete various inspection forms on which the relative condition of each item in the rental unit as well as any other defects are recorded. The property management personnel are responsible for not only recording the results of the inspection, but also maintaining accurate records of the existence and condition of the items contained in each unit. Thus, the information resulting from such manual inspections, i.e., the completed inspection forms, is typically stored, such as in physical files, which can then be referenced as required in order to determine the history of a particular item or a specific rental unit.

As a result of the manual entry and storage of the inspection information, some of the information concerning the rental unit and the assets within the rental unit can be lost or otherwise misplaced. While the records relating to the inspection of a rental unit is described above for purposes of example, records relating to the inspection of other portions of the rental property, such as the common areas and the exteriors of the buildings, and records relating to maintenance activities performed about the rental property are also manually created and stored and, as a result, are similarly prone to being lost or otherwise misplaced. In addition, the creation of work orders or other reports based on the inspection information typically requires a time-consuming manual review of the completed inspection forms. Thus, while the demands for efficient managerial services for rental properties is increasing, the conventional inventory, inspection and maintenance processes are tedious, time-consuming and error prone.

SUMMARY OF THE INVENTION

It is therefore an object of the present invention to provide a data processing system for facilitating the compilation and processing of data obtained during the management of rental properties.

It is another object of the present invention to provide a data processing system for facilitating the inspection of a rental property and an associated method of compiling inspection data for the rental property.

It is a further object of the present invention to provide a data processing system for facilitating the maintenance of a rental property and an associated method of compiling maintenance data for the rental property.

It is yet another object of the present invention to provide a data processing system and method which provides for the organized and efficient tracking of the assets and the relative condition and other characteristics of the assets of a rental property.

These and other objects are provided, according to one aspect of the present invention, by a data processing system which includes a property inspection data entry device for compiling inspection data during the inspection of a property and which includes reader means, data entry means and memory means. The reader means, such as a scanner, is responsive to labels associated with the property and various items therein which include indicia representative of the predetermined characteristics of the property and the various items therein, respectively. The data entry means, such as a keypad having a plurality of keys, is responsive to actuation by an operator of the property inspection data entry device during inspection of the property so as to receive additional inspection data relating to the property. Further, the memory means stores the inspection data relating to the property received by both the reader means and the data entry means. Thus, the inspection data relating to the condition and/or contents of a property, such as a rental unit, a common area or the exterior of a building, can be efficiently compiled and stored in a timely and accurate fashion during the inspection of the property. The inspection data can then be transferred to a host computer and further processed according to one advantageous embodiment of the present invention.

In one embodiment, the labels associated with the property include indicia relating to predetermined characteristics of the property which have been established prior to the inspection of the property. For a rental unit, for example, the indicia presented by the labels can include the apartment number or other designation of the rental unit and the number of bedrooms and bathrooms within the rental unit. Based on the predetermined characteristics of the property provided by the label, the property inspection data entry device of one advantageous embodiment can include prompting means for guiding the operator during the inspection of the property. The operator thus enters inspection data relating to the property in response to a prompt provided by the prompting means. Thus, the prompting means of this embodiment can provide prompts to the operator, typically via a display means, based upon the predetermined characteristics of the property. Accordingly, the likelihood that the operator will completely inspect all portions of the property are increased by this embodiment of the present invention.

The property inspection data entry device can also include controller means, such as a controller, for controlling the operations of the property inspection data entry device. According to one embodiment, the inspection data can include data relating to the relative condition of the property. Thus, the controller means of this embodiment can identify data relating to the relative condition of the property which does not meet a predetermined criteria or which exceeds a predetermined threshold value. In such a situation, the appropriate management personnel could then be notified that repair or replacement of certain items about the property is necessary.

The data processing system of the present invention also includes a host computer for processing inspection data collected during the inspection of a property. Thus, the property inspection data entry device can include data transfer means for establishing communication with the host computer of the data processing system and for transferring inspection data from the memory means of the property inspection data entry device to the host computer following the inspection of a property.

The host computer of the data processing system preferably includes a host controller for controlling the operations of the host computer, host memory means for storing the inspection data collected during the inspection of the property and interface means for establishing communication with the property inspection data entry device and, more preferably, with the data transfer means of the property inspection data entry device. Since the inspection data collected by the property inspection data entry device is stored by the host memory means, this embodiment of the present invention effectively eliminates the need for maintaining manual files of completed inspection forms.

In one embodiment, the host controller can include sorting means for arranging the inspection data according to at least one predetermined parameter. Thus, the property management can arrange the inspection data as desired in order to conduct an efficient inspection and analysis of the property. In addition, the host computer can include output means, such as a printer or a display screen, for generating a report, such as a work order, relating to the inspection data. For example, the output means can generate a report based upon the inspection data which has been sorted according to a predetermined parameter, such as a report identifying any property in immediate need of repair.

Accordingly, the method of this aspect of the present invention provides for compiling inspection data during the inspection of the property. In particular, the method includes the steps of reading and storing the inspection data relating to the predetermined characteristics of the property which is encoded on at least one label associated with the property. The method of the present invention can also include the step of entering, typically via manual actuation of a keypad, additional inspection data including data relating to the relative condition of the property.

Following the inspection of one or more properties, the inspection data which has been collected can be further processed. In particular, the inspection data can be transferred, such as from the property inspection data entry device, to a host computer which, in turn, stores the inspection data in the host memory means. Thereafter, the stored inspection data can be sorted according to at least one predetermined parameter and a report relating to the inspection data can be generated if desired. In addition, data relating to the relative condition of the property which fails to meet a predetermined criteria or threshold can be identified or otherwise flagged such that appropriate remedial action can be instituted.

According to another aspect of the present invention, the data processing system includes a maintenance data entry device for compiling maintenance data during the maintenance of a property, such as a rental unit, a common area or the exterior of a building. The maintenance data entry device of this advantageous embodiment includes reader means, such as a scanner, which is responsive to one or more labels associated with the property which include indicia relating to and identifying the property undergoing maintenance. The maintenance data entry device also includes data entry means, such as a keypad, responsive to actuation by the operator, for receiving maintenance data relating to the maintenance performed on the identified property. In addition, the maintenance data entry device can include memory means for storing the maintenance data relating to the property. Further, the maintenance data entry device of one embodiment can also include a timer for determining the time at which the maintenance activities were performed and the time required to complete the maintenance activities.

In one embodiment, the maintenance data entry device also includes prompting means for guiding the operator of the maintenance data entry device during entry of the maintenance data. Thus, according to this embodiment, the maintenance personnel enters the maintenance data relating to the property in response to a prompt provided by the prompting means.

During and upon completion of the maintenance activities, the maintenance data entry device of this embodiment of the present invention collects and stores the maintenance data. This maintenance data includes the data entered by the operator which relates to the type of repair or other maintenance activity which was performed, the data identifying the property undergoing maintenance and the time at which the maintenance activity was begun and/or completed. Following maintenance operations on one or more properties, the maintenance data entry means can transfer the maintenance data to a host computer which, in turn, stores and further processes the maintenance data. The host computer can then sort the maintenance data according to at least one predetermined parameter and can generate one or more reports relating to the maintenance data, if desired.

Accordingly, the data processing system and method of one embodiment of the present invention provides for the efficient and reliable compilation of inspection data relating to the relative condition of a property. According to another embodiment of the present invention, the data processing system and method provides for the efficient and reliable compilation of maintenance data relating to the maintenance activities performed on one or more properties. According to either embodiment, the data processing system and method provides for customized processing of the inspection and/or maintenance data such that reports and work orders can be generated based upon a variety of predetermined parameters.

Further, the data processing system and method of one embodiment of the present invention prompts and guides the operator during inspection or maintenance operations. Thus, the data processing system and method of this embodiment will require that the inspection or maintenance operations be completely and reliably performed and that the necessary data describing the inspection or maintenance operations be provided and stored for future processing and analysis.

BRIEF DESCRIPTION OF THE DRAWINGS

FIGS. 6A–6G are flow charts illustrating the operations performed by the property inspection data entry device according to one embodiment of the present invention.

FIGS. 7A–7L are flow charts illustrating the operations performed by the host computer according to one embodiment of the present invention.

FIGS. 9A–9E are flow charts illustrating the detailed operations performed by the maintenance data entry device according to one embodiment of the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
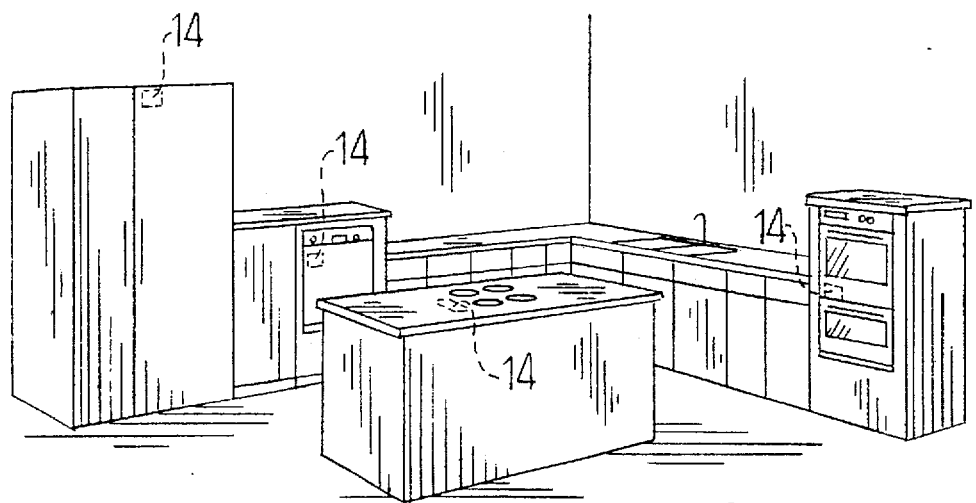
FIG. 1 is a perspective view of a rental unit in which an operator equipped with a property inspection data entry device according to one embodiment of the present invention is preparing to read a number of labels which include indicia representative of predetermined characteristics of the appliances with which the labels are associated.
Figure 2:
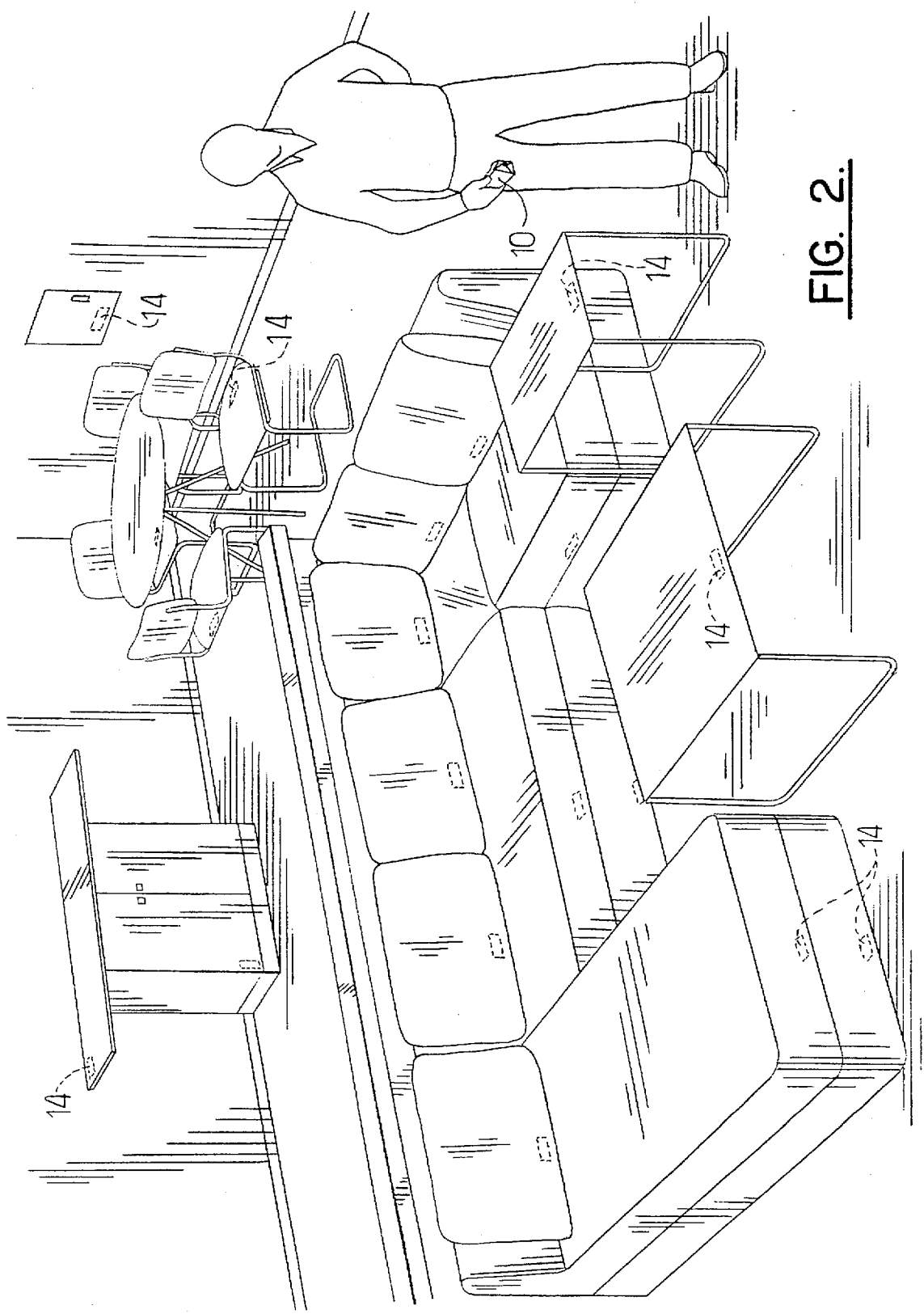
FIG. 2 is a perspective view of another rental unit in which an operator equipped with a property inspection data entry device according to one embodiment of the present invention is preparing to read a number of labels which identify the respective items with which the labels are associated.
Figure 4:
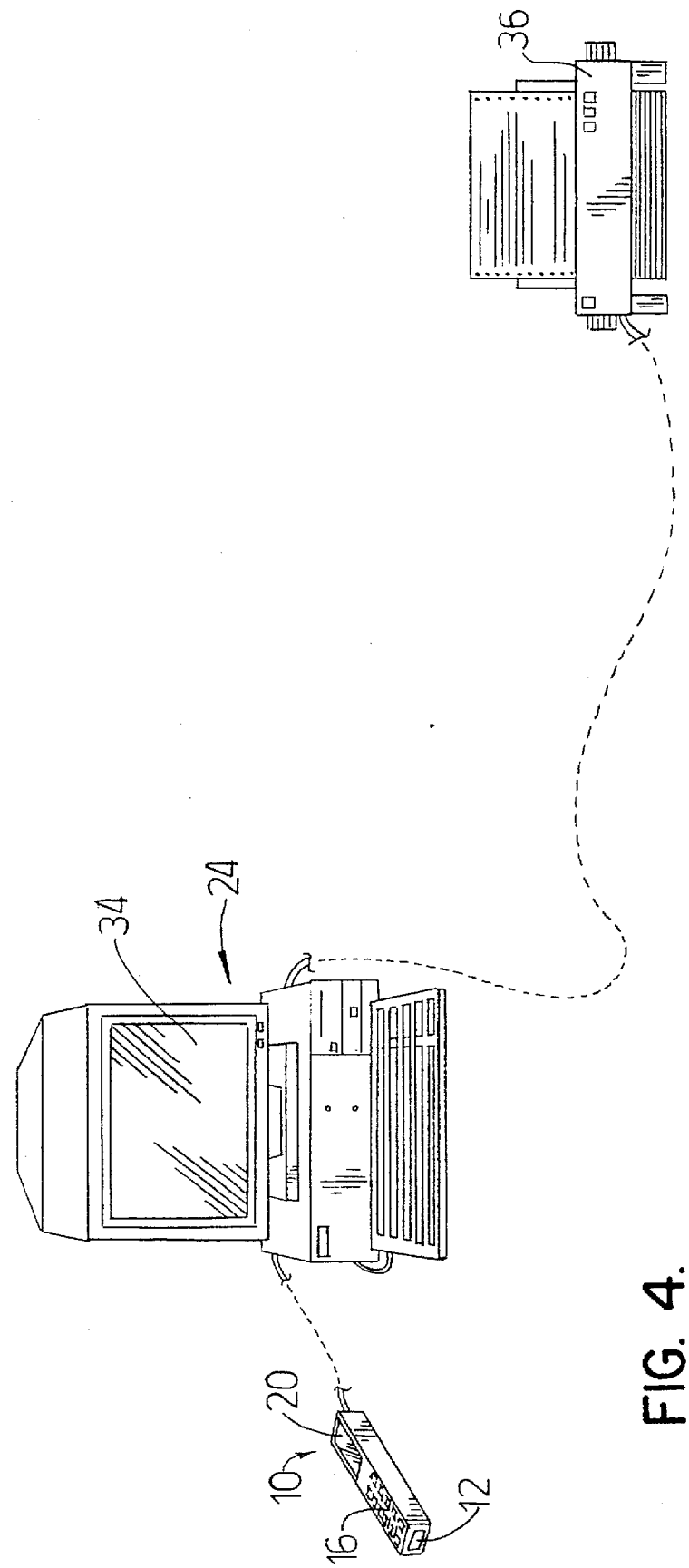
FIG. 4 is a perspective view of a data processing system according to one embodiment of the present invention which illustrates the communication between a host computer and a data entry device, such as a property inspection data entry device or a maintenance data entry device.

As described hereinafter, the property inspection data entry device 10 of the present invention can be employed to inspect a number of different types of properties. For example, the property inspection data entry device can be employed to inspect rental properties, such as one or more rental units or apartments as shown in FIGS. 1 and 2. The property inspection data entry device can also be employed to inspect the grounds or other common areas, such as pools, clubhouses and laundry facilities, of a rental property or the exterior and surroundings of one or more buildings as shown in FIG. 3.

Figure 3:
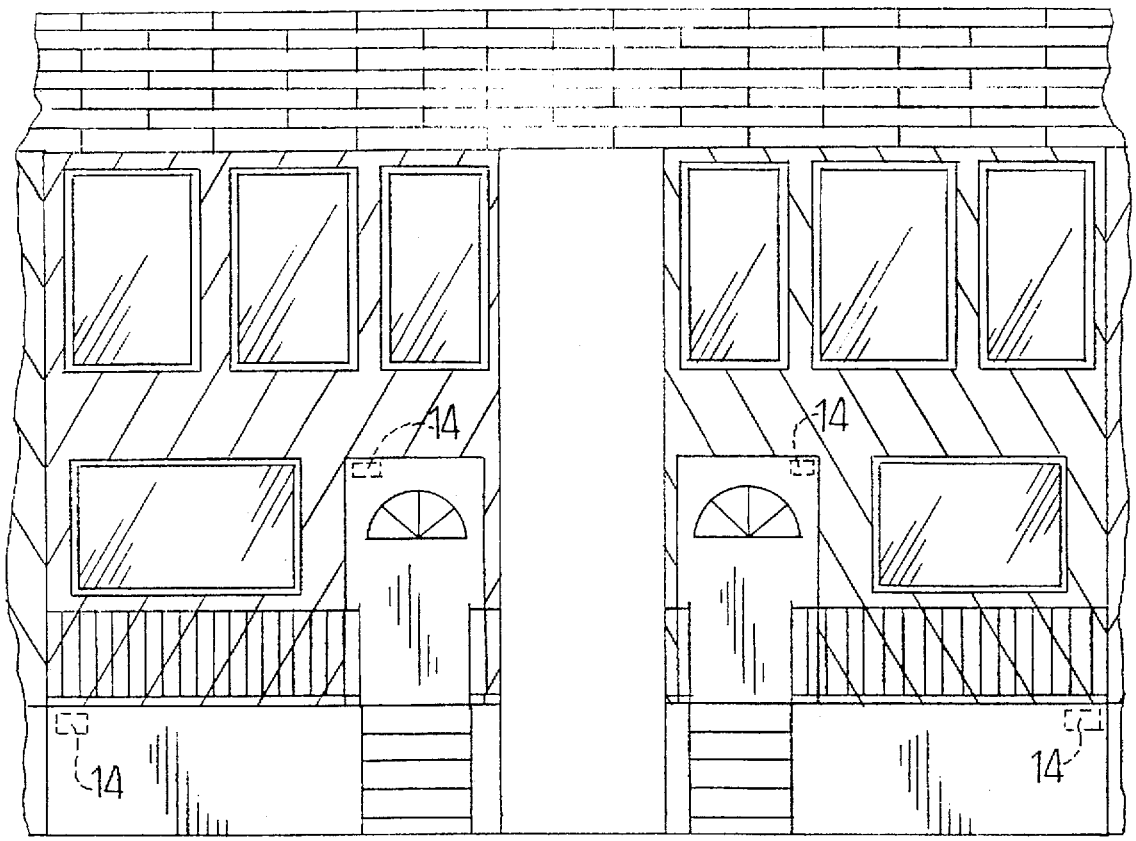
FIG. 3 is a perspective view of an operator equipped with a property inspection data entry device according to one embodiment of the present invention outside of a building which has a label attached to the exterior thereof to identify the respective building.

An operator equipped with a property inspection data entry device 10 for compiling inspection data during the inspection of a property, such as an apartment or other portions of a rental property, is illustrated in FIGS. 1–3. With respect to a rental unit, such as an apartment, the inspection of the rental unit is typically performed when the occupants of the rental unit are vacating or moving out of the rental unit. Accordingly, the general state of the rental unit can be assessed and any repairs or replacements for which the prior occupants are responsible can be determined prior to the departure of the occupants. In addition, the inspection identifies those items which must be repaired or replaced prior to leasing the rental unit to the next occupant, regardless of whether the prior occupant or the owner of the rental unit is responsible for the repairs or replacements. It will be apparent, however, that the property inspection data entry device of the present invention can also compile inspection data during inspections of a rental unit which occur at other times, such as inspections which occur annually, without departing from the spirit and scope of the present invention.

With respect to other types of property, such as the common areas and the exterior of one or more buildings, property inspections are typically performed periodically, such as on a weekly or monthly basis. The property inspection data entry device 10 of the present invention can compile inspection data collected during inspections of other types of property which occur randomly or at other time intervals without departing from the spirit and scope of the present invention.

The property inspection data entry device 10 is preferably relatively small and portable such that the operator can readily carry the property inspection data entry device with them as they inspect the property. However, the property inspection data entry device may have other shapes and sizes without departing from the spirit and scope of the present invention.

As illustrated in FIGS. 1–3 and 5, the property inspection data entry device 10 includes reader means 12 for receiving inspection data relating to predetermined characteristics of the property during the inspection of the property. As shown, the reader means is responsive to a label 14 associated with the property which includes indicia representative of at least some predetermined characteristics of the property. With respect to a rental unit, the label which includes indicia representative of at least some predetermined characteristics of the rental unit is typically mounted within an electrical breaker box as shown in FIG. 2. However, the label can be mounted adjacent the doorway of a rental unit as shown in FIG. 3 or in any other desired location without departing from the spirit and scope of the present invention. With respect to other types of property, the label can be mounted on or near the property in any manner desired. With respect to a building, for example, the label which includes indicia representative of at least some characteristics of the building can be mounted to the exterior of the building as shown in FIG. 3.

The label preferably includes indicia representative of predetermined physical characteristics of the property. For a label associated with a rental unit, for example, the label can include indicia representative of the designation of the rental unit, i.e., the apartment number and the number of bedrooms and bathrooms of the rental unit. For a label associated with other types of property, the label can include, among other things, indicia identifying the respective property. Labels can also be affixed to the assets located at various locations about the property. For a rental unit, labels can be affixed to the appliances, such as the refrigerator, the dishwasher and the stove as shown in FIG. 1. Further, for a furnished rental unit, labels can also be affixed to the articles of furniture or to other items within the rental unit as shown in FIG. 2. The labels associated with these assets typically include indicia, such as a numerical designation, representative of the appliance or other item.

Typically, the reader means 12 is a scanner, such as an optical scanner, which is responsive to bar code labels 14 which include indicia representative of the predetermined characteristics of the property. Thus, by scanning the labels associated with the property, including the labels associated with the various appliances within a rental unit, the reader means receives inspection data relating to the property, such as data identifying the property and, for a rental unit, data representative of the number of bedrooms and bathrooms and the data indicating the presence of any appliances.

In addition to the reader means 12, the property inspection data entry device 10 includes data entry means 16 for receiving additional inspection data relating to the property. Preferably, the data entry means is responsive to actuation by an operator of the property inspection data entry device during the inspection of a property such that the operator can input additional inspection data. In the illustrated embodiment, the data entry means includes a keypad having a number of keys which are individually responsive to actuation by the operator of the property inspection data entry device. Accordingly, the operator can enter additional inspection data, such as the relative condition of the property, as described in more detail hereinafter.

Figure 5:
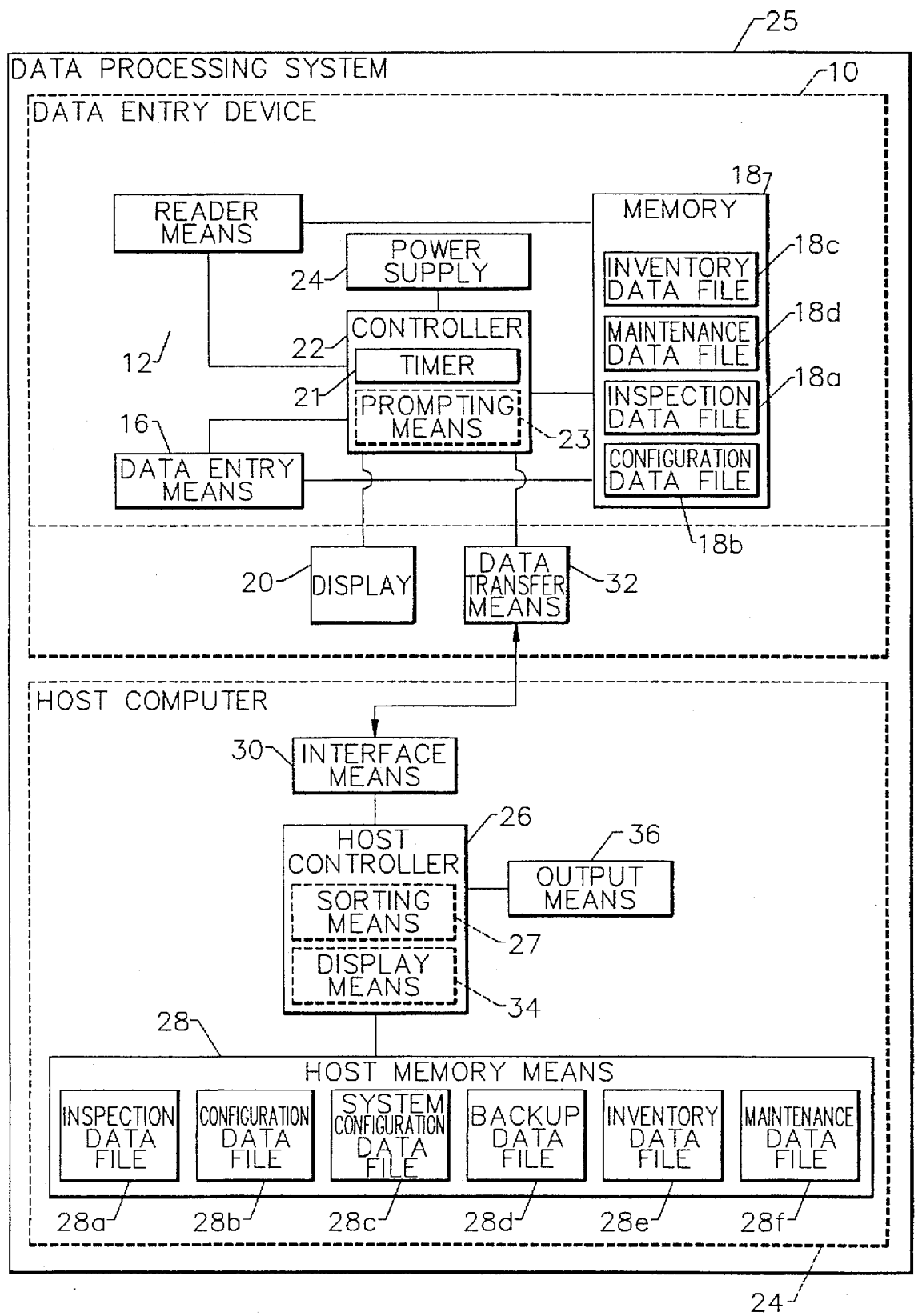
FIG. 5 is a block diagram of a data processing system according to one embodiment of the present invention which illustrates the various components of a host computer and a data entry device, such as a property inspection data entry device or a maintenance data entry device.

As illustrated in FIG. 5, the property inspection data entry device 10 also includes memory means 18, such as a random access memory module, for storing the inspection data relating to the property which has been received by both the reader means and the data entry means. For example, the memory means can store the inspection data in an inspection data file 18a which is separated or partitioned by property, such as by rental unit.

Further, the property inspection data entry device 10 can include display means, such as a display screen 20, for displaying the inspection data, such as the inspection data obtained from the labels associated with the property or the various appliances within a rental unit or the inspection data manually entered by the operator, during the inspection of the property. Accordingly, the operator can confirm that the appropriate inspection data has been entered and, if inappropriate inspection data has been entered, the operator can reenter, revise or otherwise correct the inspection data.

As also illustrated in FIG. 5, the property inspection data entry device 10 typically includes controller means 22, such as a controller or microprocessor operating under software control, for controlling operations of the property inspection data entry device. In particular, the property inspection data entry device is generally responsive to the data entry means 16 and the reader means 12. In addition, the controller typically controls the storage of data in the memory means 18 and the display of data by the display means 20.

The property inspection data entry device 10 can also include a power supply 29, such as one or more batteries. As shown in FIG. 5, the controller 22 can be operably connected to the power supply in order to notify the operator, such as via the display means 20, if the power level falls below a predetermined threshold. Upon notification of a low power level, the operator can recharge or switch batteries prior to completely losing power.

In order to illustrate one exemplary application of the property inspection data entry device 10, detailed operations of the property inspection data entry device are illustrated in FIGS. 6A–6G in conjunction with the inspection of a rental unit. As described above, however, the property inspection data entry device can be employed to inspect other types of property, such as the exterior of buildings as shown in FIG. 3, or the common areas of a rental property such as the pools and clubhouses. In addition, the sequence and/or the type of operations performed by the property inspection data entry device during an inspection of a property can be altered in order to customize the inspection process without departing from the spirit and scope of the present invention.

In the exemplary application illustrated in FIGS. 6A–6G, however, the property inspection data entry device 10 initially checks and displays the status of the power supply 29 as shown in block 40. Accordingly, if the power level of the power supply is relatively low, the operator can replace or recharge the battery prior to the inspection. Thereafter, the property inspection data entry device prompts the operator to enter the password as shown in block 41. If the operator enters an invalid password, the operator is again prompted to reenter their password as shown in block 42.

If the operator, instead, enters a valid password, the property inspection data entry device 10 displays a main menu which visually prompts the operator to select one of several options. In the illustrated embodiment, the operator can select either to perform a property inspection or, alternatively, to display additional functions as shown in block 44. As will be apparent, however, each of the various functions performed by the property inspection data entry device could be displayed by the main menu without departing from the spirit and scope of the present invention.

Figure 6A:
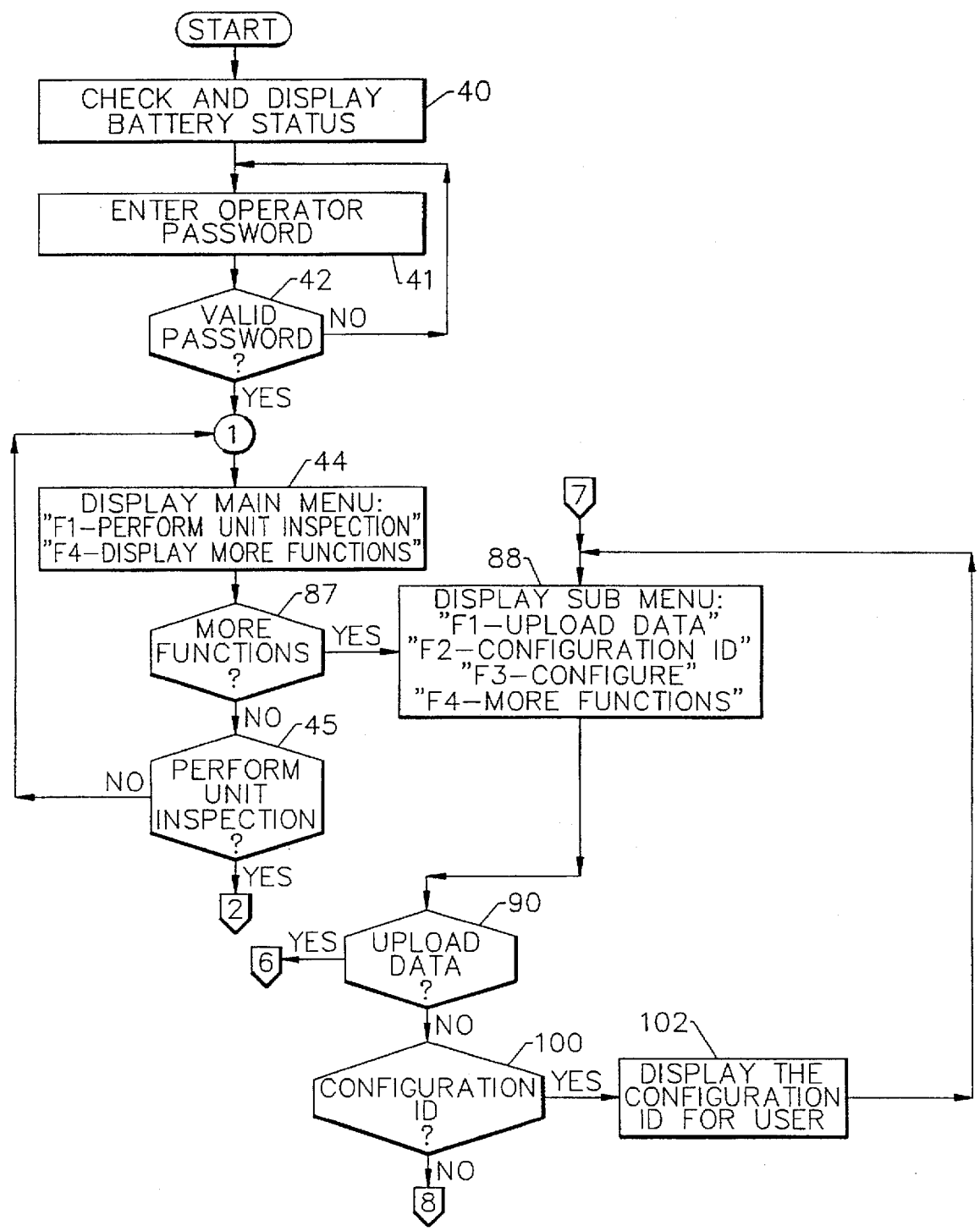

As illustrated in FIG. 6A, the operator can make a selection by depressing a predetermined key or key sequence. For example, the operator can select to perform an inspection by depressing the F1 key, and can select to display additional functions by depressing the F4 key. However, other predetermined key or key sequences or other selection means, such as a touch screen display, can be employed to select the various options without departing from the spirit and scope of the present invention. In addition, the main menu can provide the operator with additional options, such as the collection of maintenance data or the collection of inventory data as described in detail below.

If the operator does not elect to display the additional functions, but, instead, elects to perform an inspection of a property, the property inspection data entry device 10 of this embodiment initially determines if configuration data has been loaded or stored within the memory means 18 as shown in blocks 45 and 46. Typically, the configuration data is stored in a configuration data file 18b within the memory means as shown in FIG. 5. In particular, the memory means is adapted to store configuration data relating to the number of rooms and the types of features which should be inspected within each of the rooms, as described in detail below. As also explained hereinafter, the configuration data can be transferred to the memory means of the property inspection data entry device from a host computer 24 prior to the inspection.

If the memory means 18 of the property inspection data entry device 10 does not include configuration data, the property inspection data entry device can display a predetermined message, such as "Not Configured", and can return to the main menu as shown in block 48. Alternatively, if the memory means includes configuration data, the operator is typically prompted, such as by the prompting means 23 of the controller 22, to enter the location or designation of the rental unit, such as Unit 11C or Apartment 10016-G, for example, as shown in block 50. The prompting means preferably accesses the configuration data throughout the inspection process since the configuration data typically defines the types and sequence of the prompts to be provided to the operator as well as the acceptable responses to the prompts.

Figure 6B:
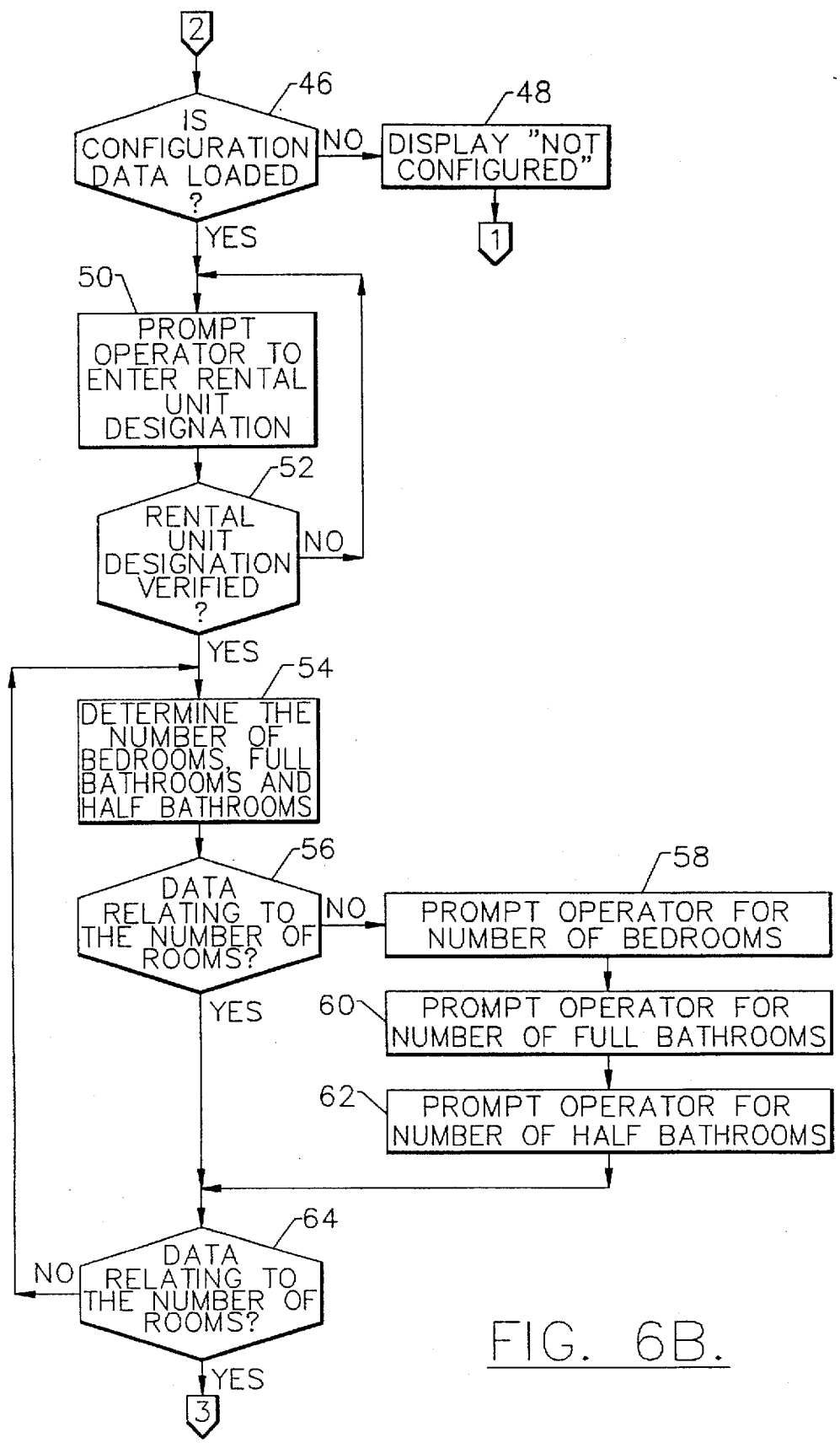
Figure 6C:
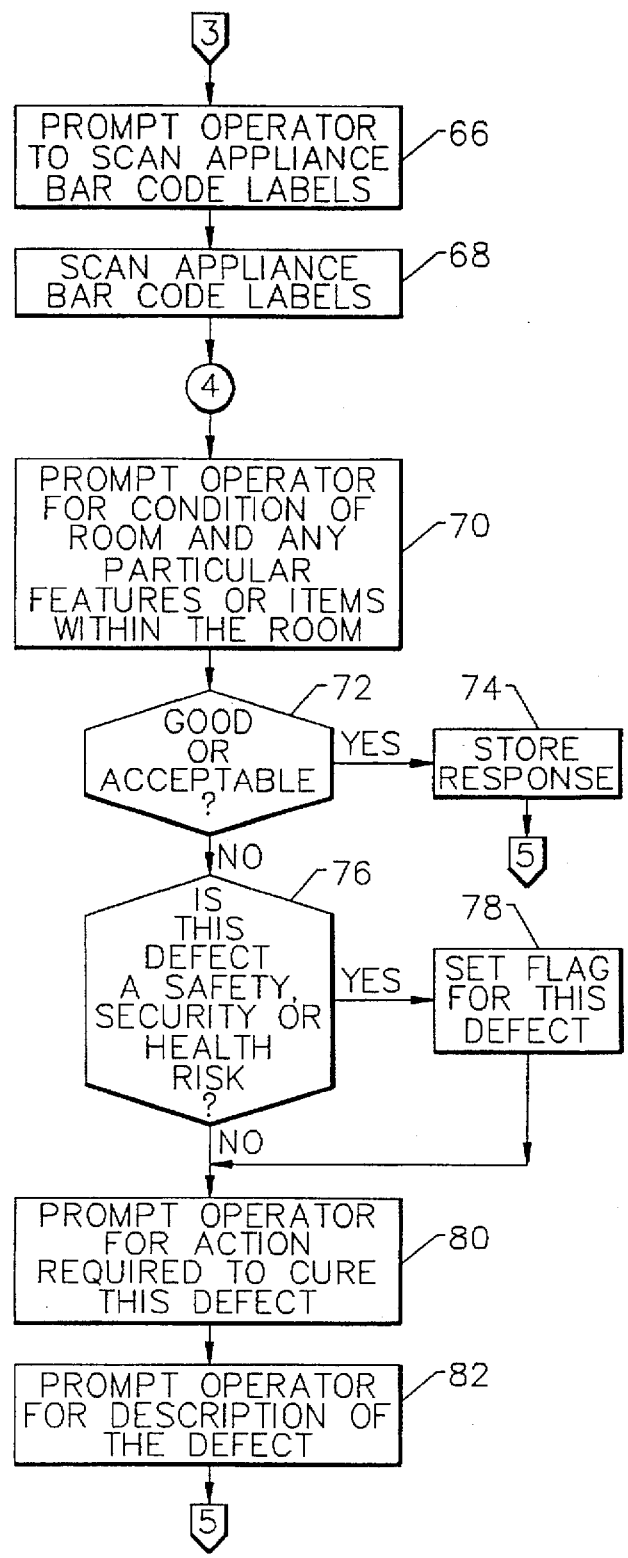
Figure 6F:
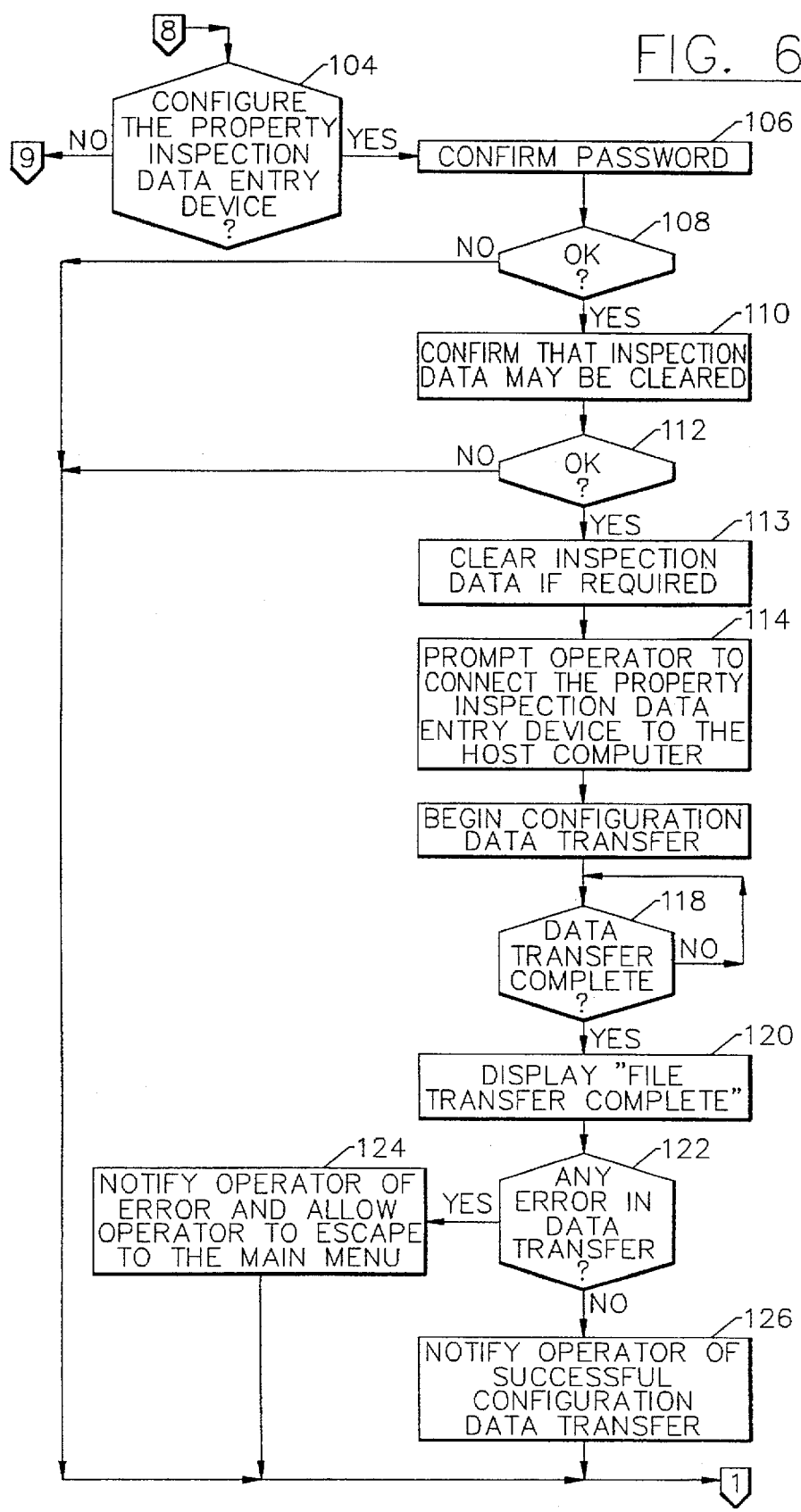
Figure 6G:
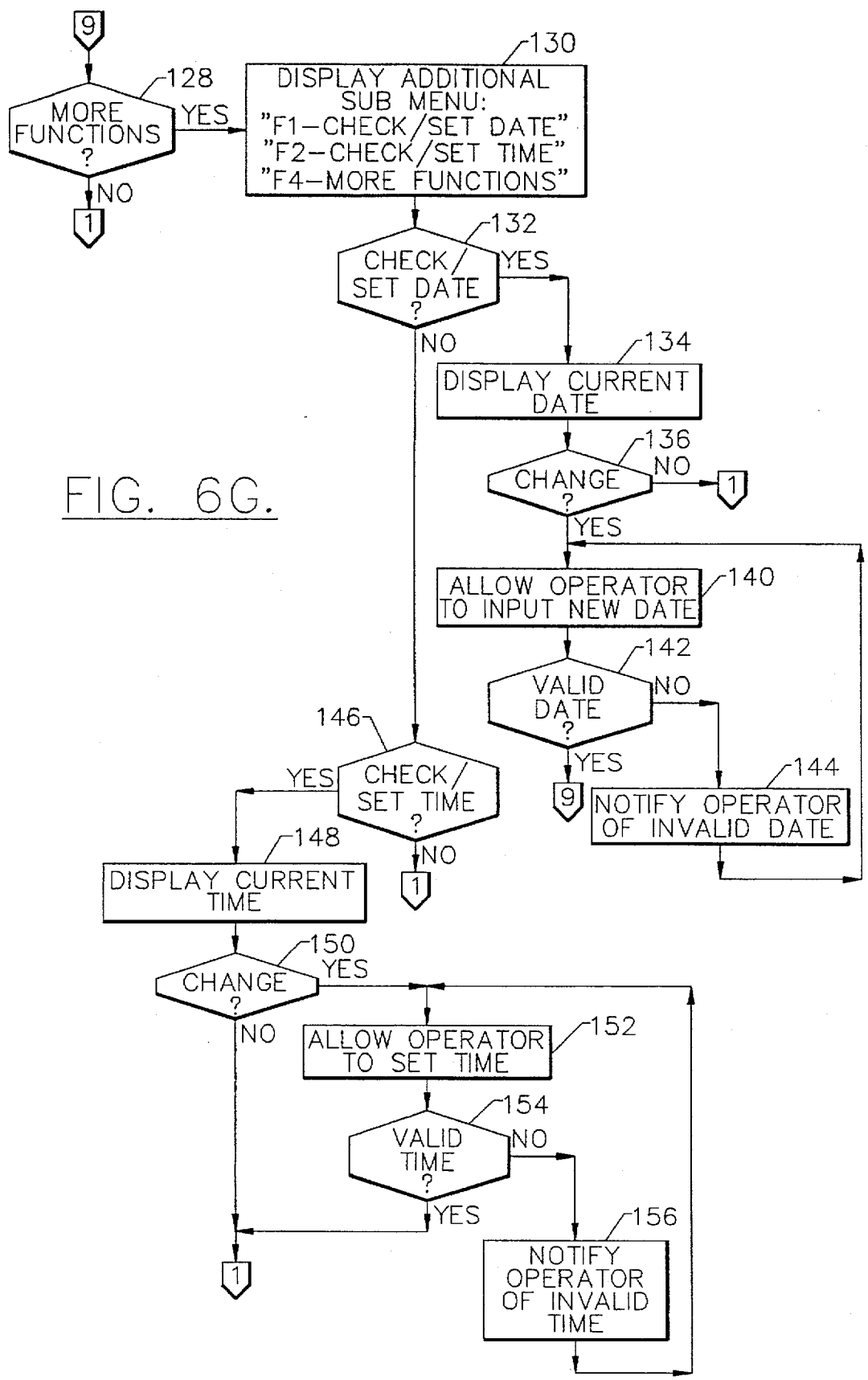
Figure 7A:
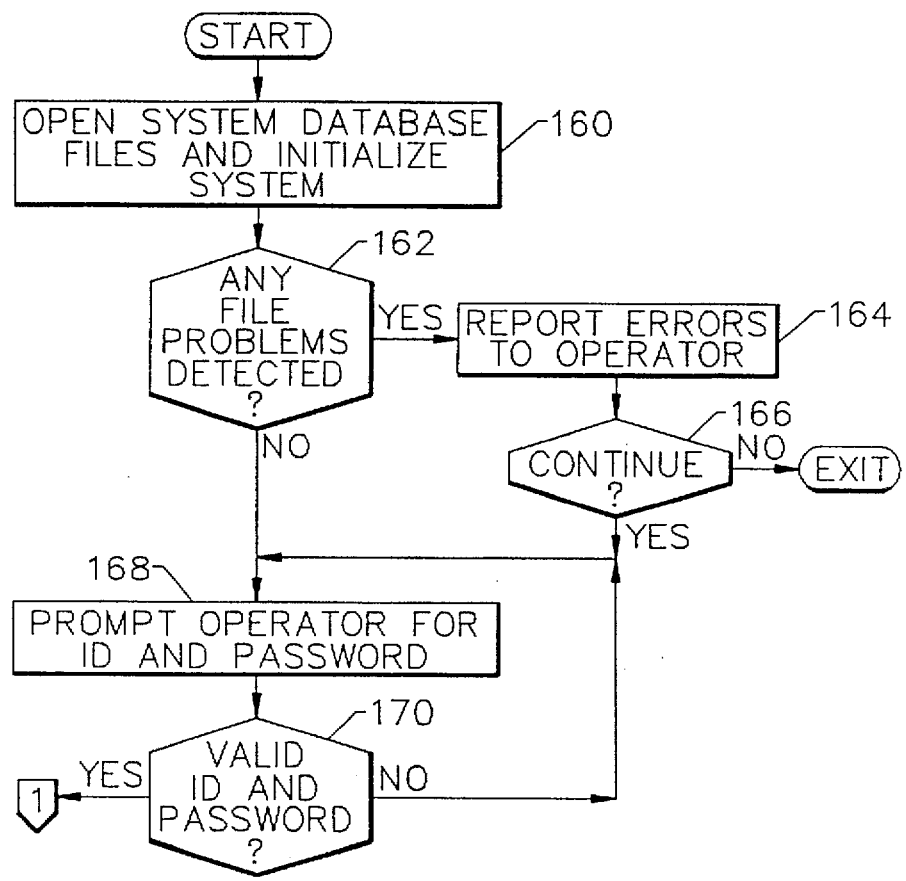
Figure 7B:
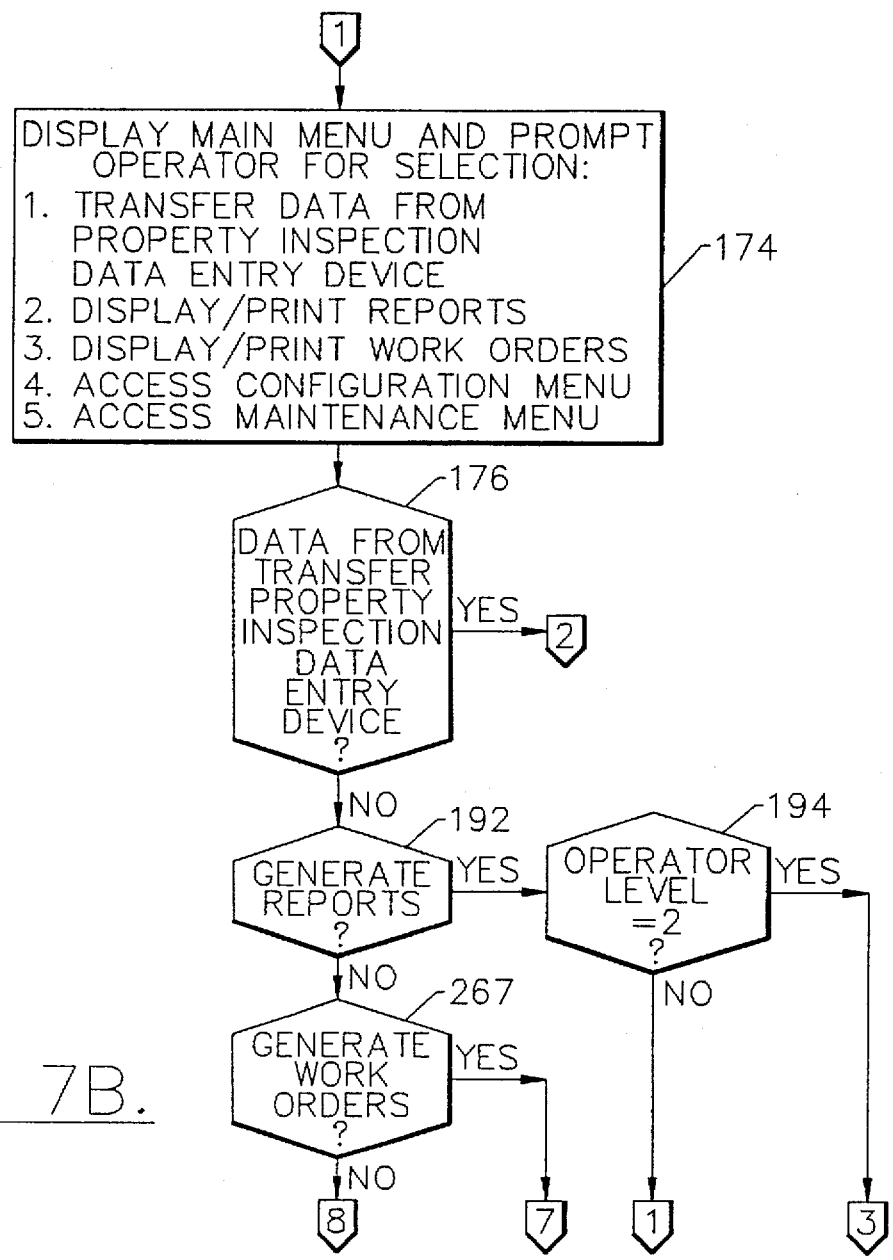
Figure 7C:
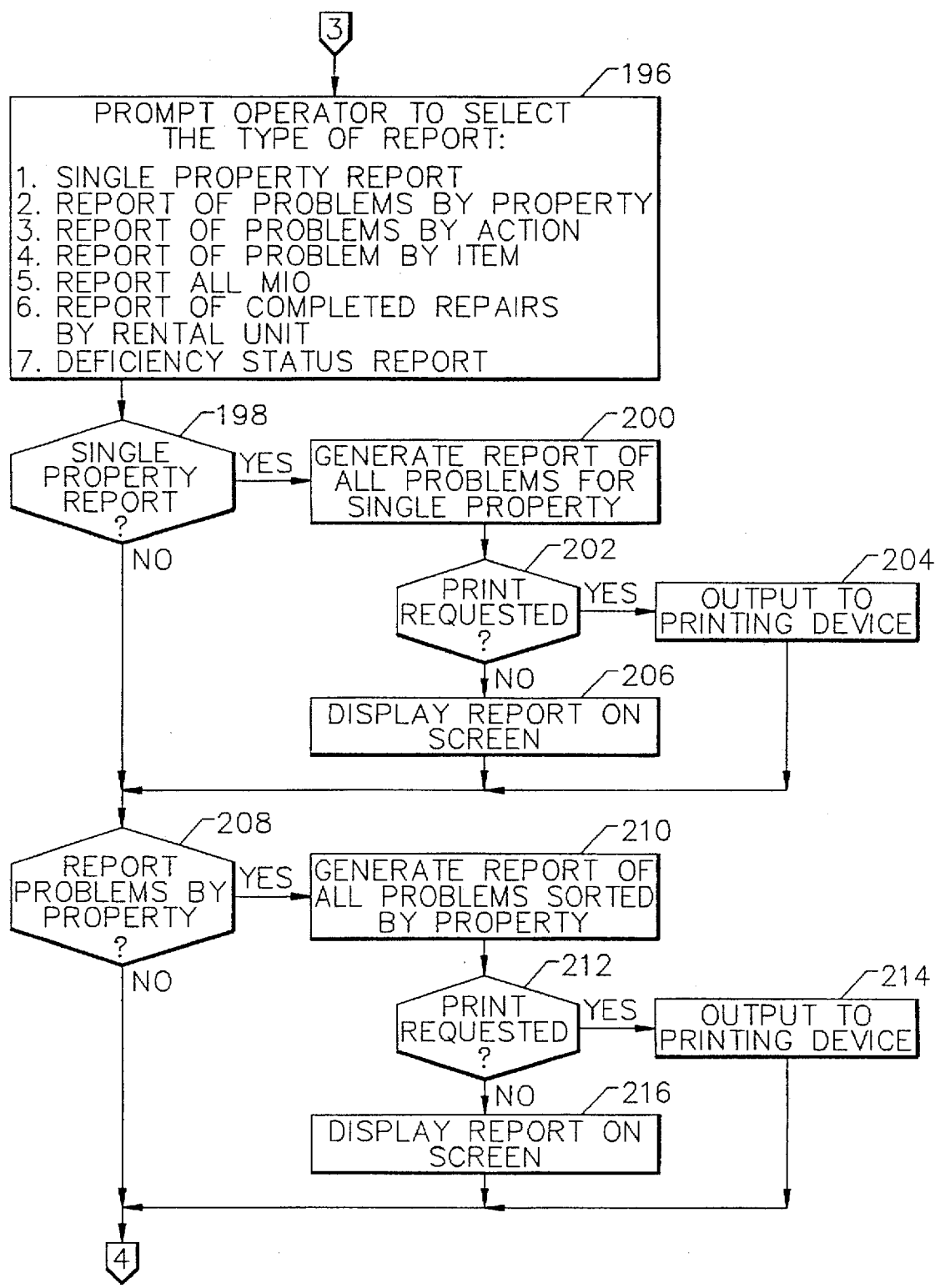
Figure 7D:
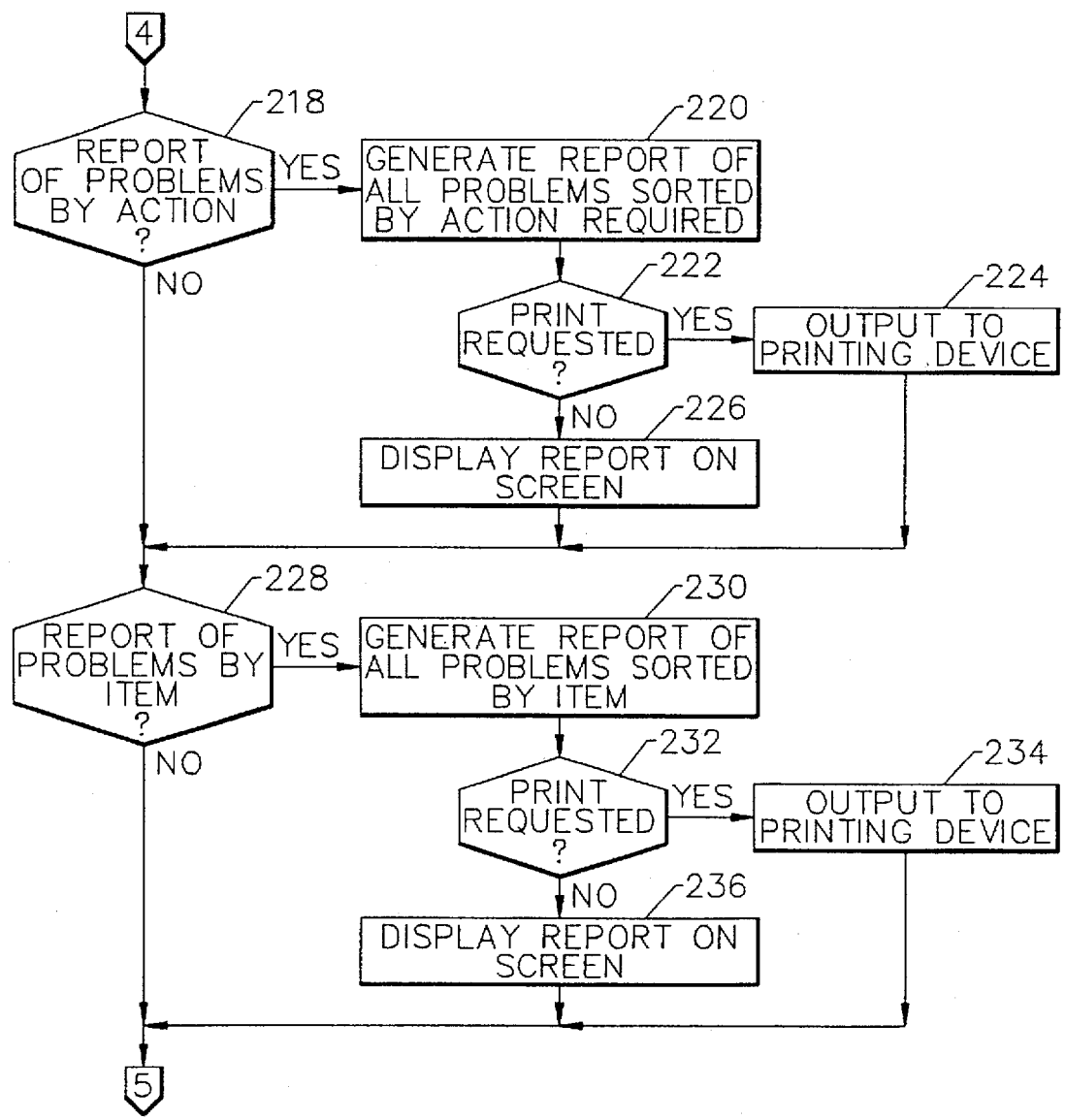
Figure 7E:
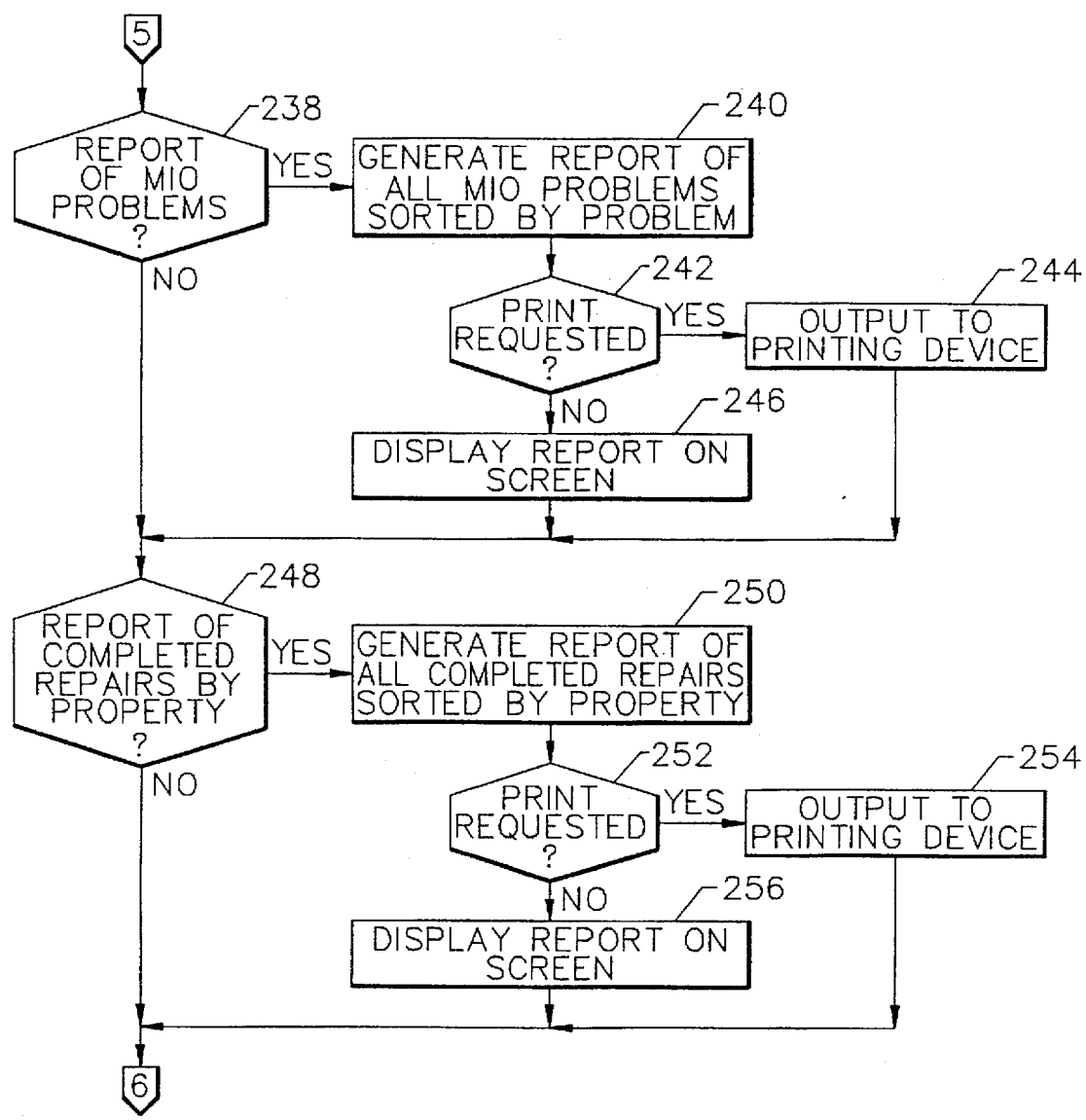
Figure 7F:
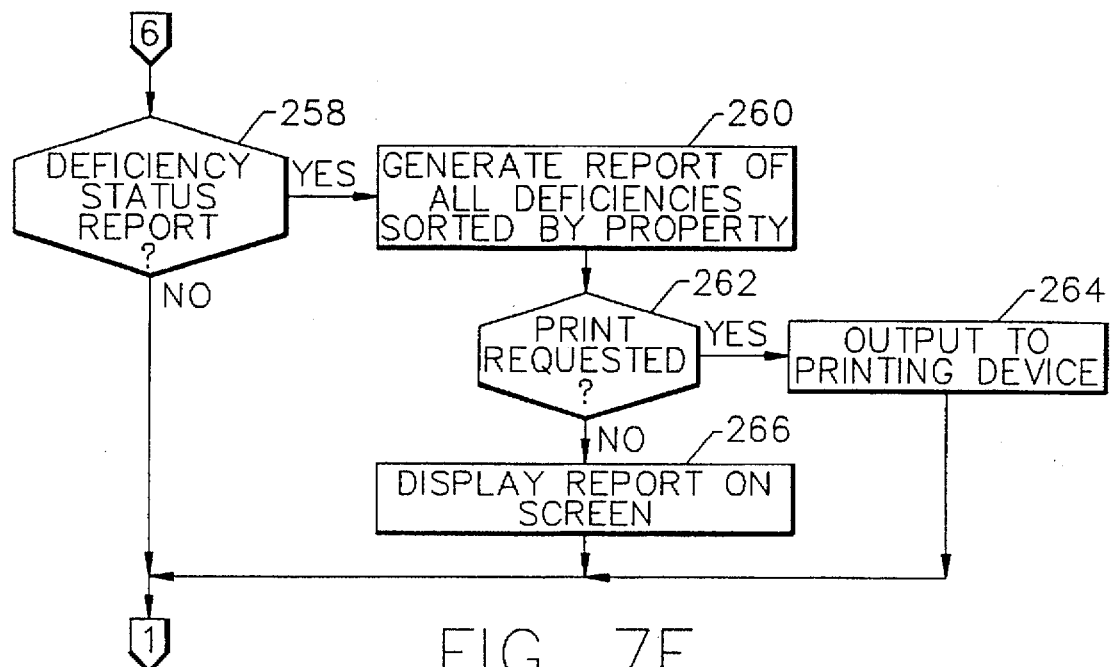
Figure 7G:
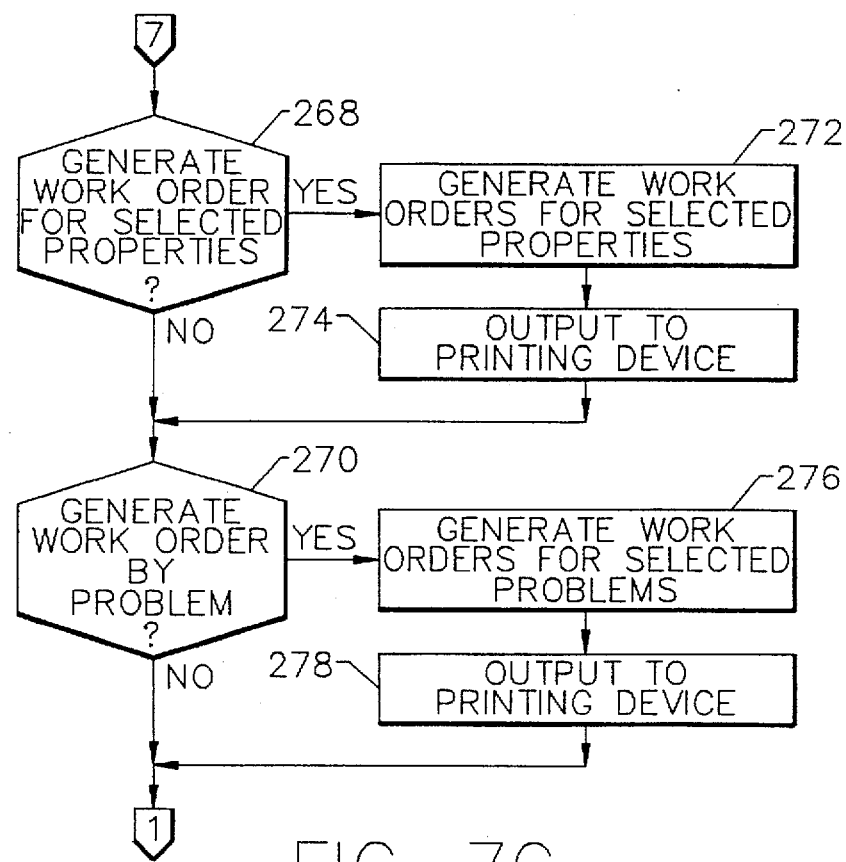
Figure 7J:
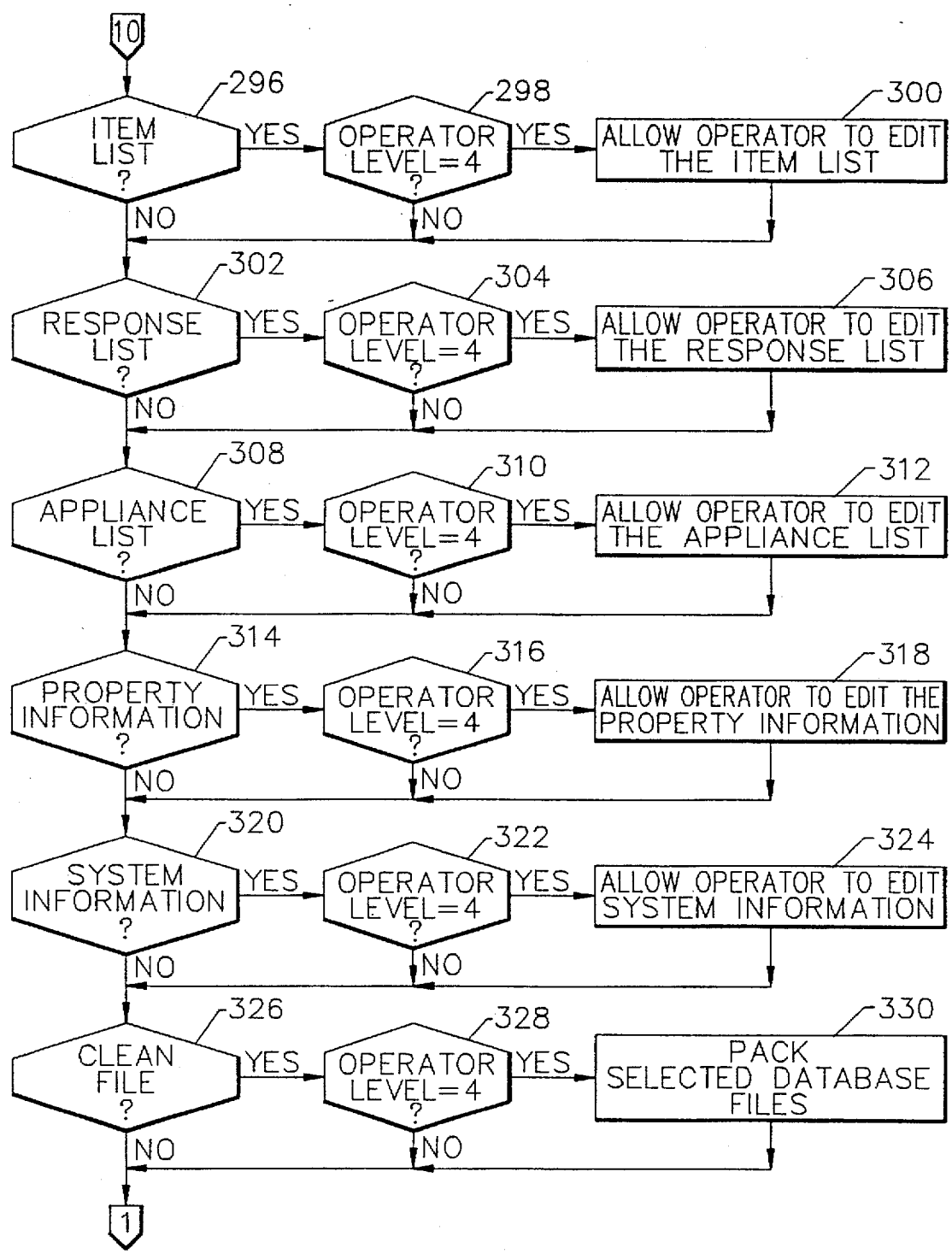
Figure 7K:
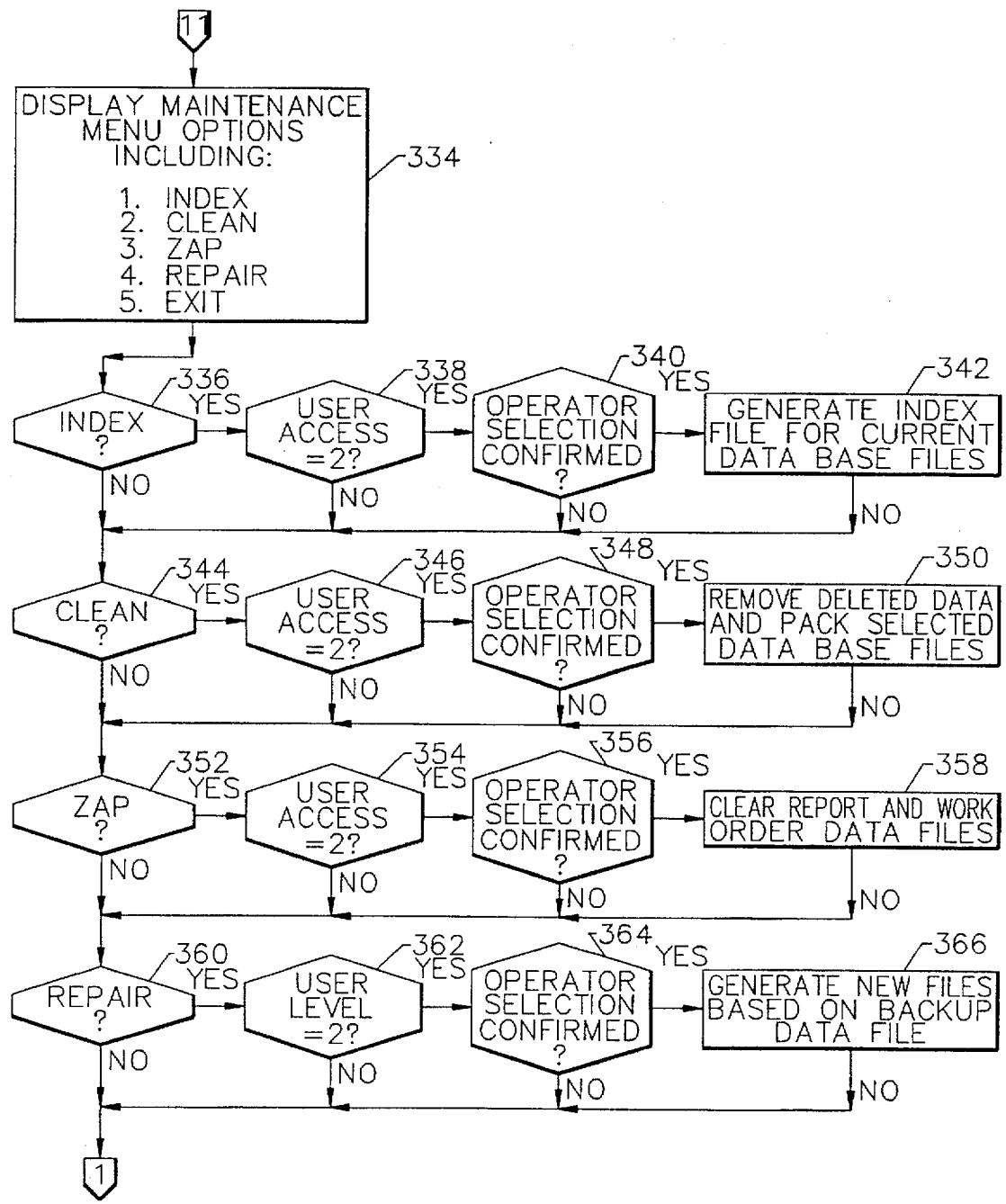
Figure 7L:
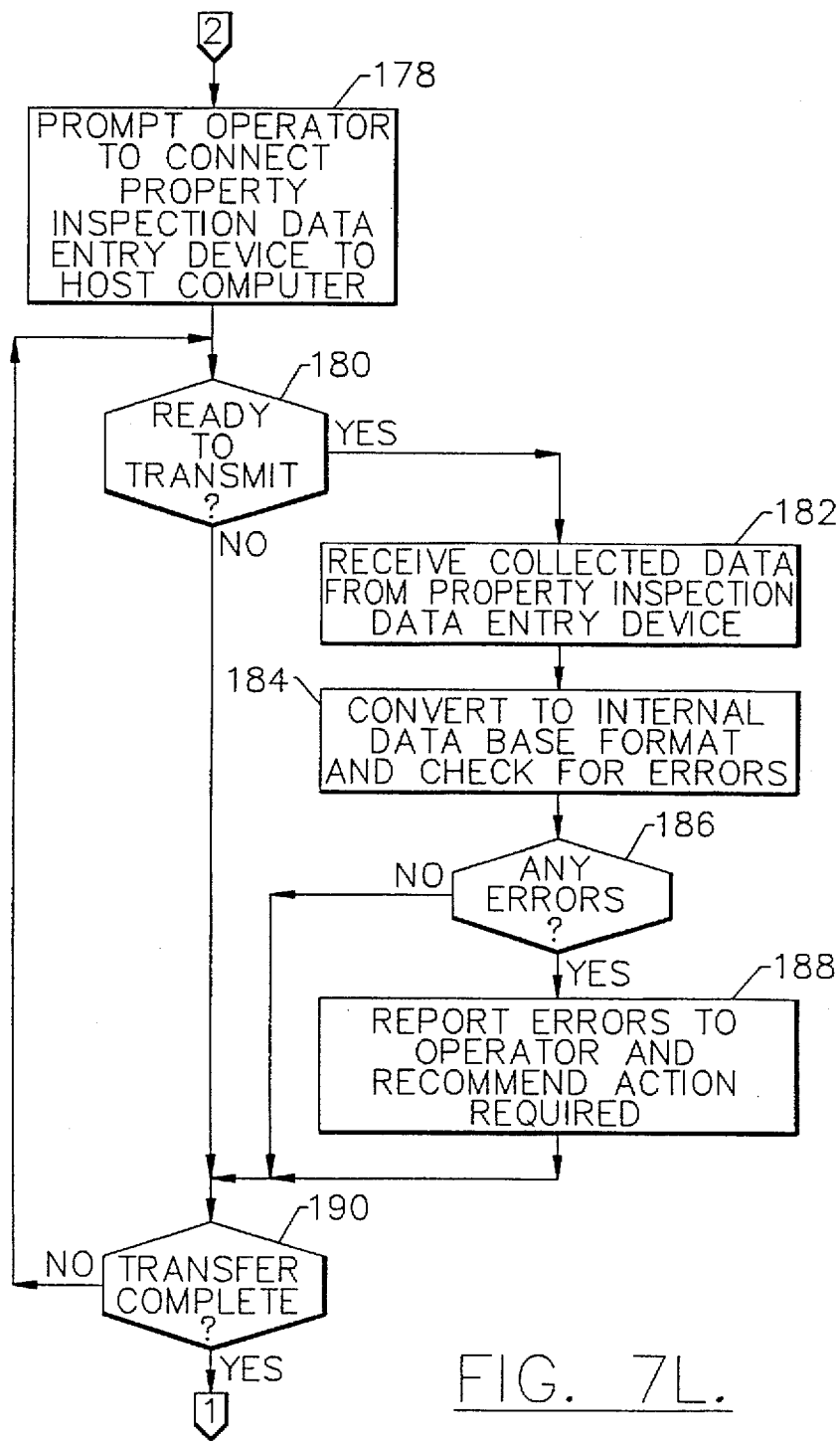

The designation of the rental unit can be entered either by scanning a label 14, such as a bar code label, associated with the rental unit with the reader means 12 of the property inspection data entry device 10 or by manually entering the designation of the rental unit via the data entry means 16. In either instance, the property inspection data entry device displays the designation of the rental unit and prompts the operator to verify that a valid rental unit designation has been entered as shown in block 52. If a valid rental unit designation has not been entered, the operator is again prompted by the prompting means 23 to enter the rental unit designation as shown in FIG. 6B. If the operator is unable to enter a valid rental unit designation, the operator can return to the main menu as shown in block 44. In particular, the operator, at any point in the inspection process, including during the process of entering the rental unit designation, can depress a predetermined key or key sequence, such as a mode key, to terminate the present operations and to return to the main menu.

If a valid rental unit designation has been entered, however, the property inspection data entry device 10 determines the number of bedrooms, the number of full bathrooms and the number of half bathrooms of the rental unit being inspected based upon the data provided by the label associated with the rental unit and as shown in block 54. If some or all of this data is unavailable, the property inspection data entry device prompts the operator to enter the unavailable data, such as the number of bedrooms, the number of full bathrooms and/or the number of half bathrooms, typically via the data entry means 16, as shown in blocks 56–62. The property inspection data entry device and, more particularly, the prompting means then prompts the operator to confirm that the rental unit has the designated numbers of bedrooms, full bathrooms and half bathrooms as shown in block 64. Accordingly, the validity of the data provided by the label associated with the rental unit or entered by the operator can be, at least partially, confirmed.

Thereafter, the prompting means 23 of the property inspection data entry device 10 prompts the operator to read the labels 14 associated with the various appliances within the rental unit. In the illustrated embodiment, the operator is prompted to optically scan the bar code labels associated with each of the appliances within the rental unit as shown in FIG. 1 and blocks 66 and 68 of FIG. 6C. Once the operator has scanned each of the bar code labels associated with the various appliances within the rental unit, the property inspection data entry device prompts the operator to sequentially inspect each of the rooms within the rental unit as shown in block 70. In addition, if any of the rooms include any particular features or items which should be specifically inspected, the prompting means of the property inspection data entry device can also prompt the operator to specifically inspect those features or items during the overall inspection of the room in which the feature or item is located. For example, the property inspection data entry device may prompt the operator to inspect the fireplace during the inspection of the living room in which the fireplace is located, or the property inspection data entry device may prompt the operator to inspect various closets during the inspection of a bedroom in which the closets are located.

Upon beginning the inspection of a room, the property inspection data entry device 10 provides the operator with the ability to skip the detailed inspection of the room, such as if the room is in pristine condition, and to continue with the inspection of the next room. If the operator elects to conduct a detailed inspection of the room, however, the property inspection data entry device provides a number of prompts requesting information relating to the relative condition of the room and the various items within the room, such as the carpet, lighting, etc. In response to each prompt, the operator enters the relative condition of the item being inspected, such as by depressing a predetermined key or key sequence. In the illustrated embodiment, the appropriate responses are "good", "acceptable", "requires action" and "immediate action required". If the operator enters either "good" or "acceptable", the memory means 18 of the property inspection data entry device 10 stores data representative of both the response and the items to which the response relates in the portion of the inspection data file 18a which relates to the rental unit being inspected as shown in blocks 72 and 74.

If the operator enters a response of "requires action" or "immediate action required", instead, the property inspection data entry device 10 of this embodiment prompts the operator to identify if the defect poses a safety, security or health risk. If so, this defect is specifically identified or flagged such that appropriate remedial action can be taken as shown in blocks 76 and 78. In addition, the property inspection data entry device typically prompts the operator to identify the type of remedial action required to cure the defect, such as full replacement, partial replacement, repair or cleaning such that the property management personnel can appropriately respond to the defect as illustrated in block 80. The property inspection data entry device also prompts the operator to enter a description of the defect, typically via the data entry means 16, as shown in block 82. The property inspection data entry device preferably stores data representative of the response, the type of remedial action required, the description of the defect as well as a flag if the defect poses a safety, security or health risk. As described above, the property inspection data entry device preferably stores this data in the portion of the inspection data file 18a relating to the rental unit being inspected. Although not illustrated, the property inspection data entry device can also prompt the operator to enter the estimated costs of any required repairs as well as to identify whether the repair can be performed by the maintenance personnel on staff or whether an independent contractor will be required.

The property inspection data entry device 10 and, more particularly, the controller 22 typically maintains a running log or count of the rooms which have been inspected as well as the items within each room which have also been inspected. If the operator has not completely inspected a room, the property inspection data entry device can display another prompt requesting the operator to inspect the next item within the room according to the process described above and illustrated in blocks 70–82. Following the inspection of each room, however, the property inspection data entry device can prompt the operator to verify that all items within the room have been inspected as shown in blocks 85 and 86. If all items within the room have been inspected, the property inspection data entry device can determine if the most recently inspected room was the last room to be inspected, as shown in block 84, based upon a comparison of the rooms which have been inspected to the number of rooms within the rental unit as provided by the configuration data downloaded from the host computer 24. If each room of the rental unit has not been inspected, the property inspection data entry device can prompt the operator to inspect the next uninspected room as shown in blocks 70–82 prior to completing the inspection process and returning to the main menu. However, if the property inspection data entry device determines that the most recently inspected room was the final room to be inspected, the property inspection data entry device can request the operator to confirm that each room of the rental unit has been completely inspected as shown in blocks 87 and 89 and, if so, can return to the main menu.

If, upon presentation of the main menu, the operator initially elects to display additional functions as shown in block 87, a submenu is displayed. As illustrated in block 88, the submenu prompts the operator to select to upload the inspection data, display the configuration ID, configure the property inspection data entry device 10 or display additional functions.

If the operator selects to upload data, the property inspection data entry device 10 is connected, typically via an electrical or optical connection, to a host computer 24 and the inspection data is transferred from the memory means 18 of the property inspection data entry device to the host computer as shown in blocks 91–99 and as explained hereinafter. While data can be transferred between the property inspection data entry device and the host computer according to any desired format and/or protocol, the data is typically transferred according to an X-modem based protocol which includes ACK/NACK handshaking. Alternatively, if the operator selects to display the configuration ID, the configuration ID which generally relates to the version of the configuration data which has been downloaded into the property inspection data entry device is displayed by the display means 20 as shown in blocks 100 and 102.

As shown in blocks 104–112, if the operator selects to configure the property inspection data entry device 10, the property inspection data entry device requests the operator to confirm their password and reconfirms that the operator desires the data to be cleared. By confirming the password of the operator and reconfirming that data will be cleared or otherwise destroyed, the property inspection data entry device prevents inadvertent destruction of inspection data since the inspection data file 18a may be overwritten, at least partially, during the configuration process as shown in block 113. Thereafter, the operator can connect the property inspection data entry device to the host computer 24 and initiate a transfer of configuration data to the configuration data file 18b of the memory means 18, as shown in blocks 114 and 116 and as explained in detail hereinafter. Once the data transfer is complete, the operator is notified, such as by a predetermined message, i.e., "File Transfer Complete", as shown in blocks 118 and 120. In addition, the operator is notified of any errors which occur during the data transfer or, if no errors occurred, the operator is notified of the successful transfer of the configuration data as shown in blocks 122–126.

If, when presented with the submenu of block 88, the operator elects to display additional functions, another submenu is displayed as shown in blocks 128 and 130. This additional submenu can include a variety of functions but, in the illustrated embodiment, allows the operator to check and set the date, to check and set the time or to display still additional functions. According to the illustrated embodiment, the controller 22 of the property inspection data entry device 10 includes a timer 21 which maintains the current date and time. However, various other components of the property inspection data entry device 10 and/or the host computer 24 can maintain the date and time without departing from the spirit and scope of the present invention. Accordingly, the date and time at which each inspection is conducted can be noted and saved in the inspection data file 18a.

If the operator elects to display additional functions, the submenu of block 88 is again displayed. Alternatively, if the operator elects to check and set the date, the current date is displayed as shown in blocks 132 and 134. In addition, the property inspection data entry device 10 polls the operator to determine if the operator desires to alter the current date as shown in block 136. If so, the property inspection data entry device allows the operator to input a new date as shown in block 140 and, if the new date is valid, returns to the submenu of block 88. Alternatively, if the date is invalid, the operator is notified of the invalid date, as shown in blocks 142 and 144, and the process of checking and setting the date is repeated.

Similarly, if the operator selects to check and set the time, the current time is displayed and the operator is polled to determine if they desire to alter the current time as illustrated in blocks 146–150. If so, the operator enters the new time as shown in block 152 and, if the new time is valid, the submenu of block 88 is again displayed. Alternatively, if the time is invalid, the operator is notified of the invalid time and the process of checking and setting the time is repeated as shown in blocks 154 and 156.

The property inspection data entry device 10 is one component of the data processing system 25 of the present invention. As illustrated in FIG. 2, the data processing system also includes a host computer 24 for processing the inspection data collected during the inspection of the property, such as a rental unit in the above example. In particular, the host computer includes a host controller 26 for controlling the operations of the host computer. In addition, the host computer includes host memory means 28, responsive to the host controller, for storing the inspection data collected during the inspection of the property.

The host computer 24 also includes interface means 30, such as a serial port, for establishing communication, typically electrical or optical communication, with a property inspection data entry device 10. Correspondingly, the property inspection data entry device preferably includes data transfer means 32 for transferring the inspection data from the memory means 18 of the property inspection data entry device to the host memory means 28 of the host computer following the inspection of the property and upon the establishment of communication by the interface means of the host computer. As described hereinafter, the host computer can also receive other types of data in addition to inspection data, such as maintenance data and/or inventory data, without departing from the spirit and scope of the present invention.

As explained above, the property inspection data entry device 10 compiles inspection data during the inspection of one or more properties. Following the inspection of the properties, the property inspection data entry device can be electrically connected to the host computer 24 such that the inspection data, typically stored in the inspection data file 18a of the memory means 18, can be transferred to the host memory means 28 and, more particularly, to an inspection data file 28a within the host memory means of the host computer. The host computer and, more particularly, the host controller 26 can also include sorting means 27 for processing or sorting the inspection data, as desired, according to one or more predetermined parameters. Accordingly, the host computer can generate customized reports or work orders based upon the inspection data.

The host memory means 28 can also include a configuration data file 28b in which configuration data relating to the property is stored. As described above, the property inspection data entry device 10 can be connected to the host computer 24 prior to an inspection of a rental unit such that configuration data can be transferred from the host memory means to the configuration data file 18b of the memory means 18 of the property inspection data entry device such that the property inspection data entry device can provide the appropriate prompts for the operator and can identify appropriate responses to the respective prompts during the inspection process.

In order to illustrate one exemplary application of the host computer 24, detailed operations of the host computer are illustrated in FIGS. 7A–7L. However, the sequence and/or the type of operations performed by the host computer can be altered in order to customize the data processing system without departing from the spirit and scope of the present invention.

As shown in block 160, the host computer 24 initializes the data processing system 25 and opens the various system database files as a first step. If any problems are detected during the process of opening the database files, the detected error is reported to the operator and the operator is given the option of discontinuing operations as shown in blocks 162–166. If no file problems are detected or if the operator elects to continue even though file problems are detected, the operator is initially prompted to enter their ID and password as shown in block 168. The host computer then determines if the operator has entered a valid ID and password as illustrated in block 170. If the ID and/or password are invalid, the data processing system provides the operator with another opportunity to enter the appropriate ID and password.

If a valid ID and password are entered, however, the main menu is displayed as illustrated in block 174 and the operator is prompted to select one of several options. In particular, the operator can select to transfer data from the property inspection data entry device 10, to display and/or print reports, to display and/or print work orders, to access a configuration menu or to access a maintenance menu. If the operator selects to transfer data from the property inspection data entry device, the operator of one embodiment of the present invention is prompted to connect the property inspection data entry device to a serial port of the host computer 24 as shown in blocks 176 and 178. The host computer then determines if the property inspection data entry device is ready to transmit data and, if so, the host computer receives the inspection data collected during the inspection of the property as shown in blocks 180 and 182. The inspection data is then converted to a predetermined format for storage in the host memory means 28 and the inspection data is checked for errors as illustrated in blocks 184 and 186. If any errors are detected, the errors are reported to the operator and a recommended response, such as retransmission of the inspection data, is provided as shown in block 188. Alternatively, if no errors are detected, the host computer determines if the transfer is complete as shown in block 190 and, if the transfer is incomplete, determines if the property inspection data entry device is ready to transmit the additional inspection data. Consequently, the data transfer continues until the inspection data has been completely transferred. Once the transfer is complete, the host computer returns to the previous operations of the data processing system 25.

In a similar fashion to that described above, the property inspection data entry device 10 also executes a sequence of operations, simultaneous with the host computer 24, to initiate and complete the transfer of inspection data therebetween. In particular, once the host computer and the property inspection data entry device have been connected, the property inspection data entry device determines if it is ready to transmit data, such as the inspection data, as shown in block 91 of FIG. 6E. Once the property inspection data entry device is ready to transmit the data, the property inspection data entry device determines if the data is stored in the memory means 18 and, if the data is not stored within the memory means, transmits a predetermined error message, such as "no data to transmit". If the data to be transmitted does exist, however, the data transfer means 32, such as a serial port, of the property inspection data entry device is initialized and data is transferred to the host computer as shown in blocks 94 and 95. Once the data has been completely transferred, the property inspection data entry device determines if a successful data transfer has occurred as shown in blocks 96 and 97. If an error has occurred during the data transmission, a predetermined error message is displayed as shown in block 98. Alternatively, the property inspection data entry device can display a predetermined message indicative of the successful completion of the data transfer and, in some embodiments, that the transferred data will be cleared from the memory means 28 of the property inspection data entry device as shown in block 99.

If, instead of electing to transfer data from the property inspection data entry device 10 when presented with the main menu of block 174, the operator elects to generate reports, the host computer 24 determines if the operator is authorized to generate reports as shown in blocks 192 and 194. In particular, each operator is typically assigned a level with increasingly higher levels, such as 2, 3 and 4, being assigned to operators who are cleared to perform the more difficult, expensive and/or time-consuming operations. If the operator is appropriately cleared to generate reports, such as an operator having a security level of 2 or greater, the operator is prompted to identify the type of report to be generated. In particular, the operator is prompted to select one of several predetermined types of reports, such as a single property report, a report of problems by property, a report of problems by action, a report of problems by item, a report of all Management Improvement and Operations items (MIOs) as required for HUD properties, a report of completed repairs by property and a deficiency status report, as shown in block 196. However, the host computer can be readily configured to prepare other types of reports based upon the type of property and the inspection data collected based upon the requirements of the operator.

If the operator elects to generate a single property report, for example, the sorting means 27 of the host controller 26 sorts the inspection data to identify all data relating to the selected property, such as a rental unit, for example, since the inspection data represents the data collected during the inspection of the property and transferred from the property inspection data entry device 10 to the host computer 24 as described above. The host computer thereafter generates a report from the sorted inspection data which identifies all problems identified for the selected property, such as all problems reported within a predetermined range of dates, as illustrated in block 198. The report can then be printed or displayed on the display screen 34 of the host computer as shown in blocks 200-206. Alternatively, if the operator selects to generate a report of problems by property, the sorting means sorts the inspection data to identify each occurrence of a predetermined type of problem, such as paint problems or worn carpeting, as well as a designation of the property having the problems. The host computer can then generate a report identifying each property which has been identified within a predetermined time period as having the predetermined type of problem, as shown in blocks 208-216.

Similarly, if the operator elects to generate a report of problems by action required, the sorting means 27 sorts the inspection data to identify all problems which require a predetermined type of action. The host computer 24 then generates a report which identifies all problems which require the predetermined type of action as shown in blocks 218-226. For example, the report would identify all problems, such as by rental unit designation and room, which require a predetermined action, such as repair. In addition, the operator can elect to generate a report of problems by item which identifies all problems associated with a predetermined type of item, such as a stove, refrigerator or ceiling, as shown in blocks 228-236. Further, if the operator elects to generate a report of all MIO problems, the sorting means sorts the inspection data to identify all MIO problems. The host computer then generates a report which identifies all MIO problems, typically sorted according to the type of problem, as shown in blocks 238-246. As known to those skilled in the art, MIO reports are oftentimes required by the various governmental agencies, such as HUD, which oversee government subsidized housing units.

Additionally, the operator can elect to generate a report of completed repairs by property, such as by rental unit, which identifies all repairs which have been completed within a designated property as shown in blocks 248-256. Finally, as illustrated in blocks 258-266, the operator can elect to generate a deficiency status report which identifies all deficiencies for a predetermined property, that is, a report which identifies all items, such as smoke detectors, which are missing, damaged or otherwise inoperable at the predetermined property.

As described above in conjunction with the single property report, each of the above-described reports can be printed, such as by the printer or other output means 36 of the host computer 24, or the reports can be displayed, such as on the display screen 34 of the host computer, if desired.

As described hereinafter, the host computer of the present invention can also print a variety of reports based upon other types of data, such as maintenance data and/or inventory data.

Alternatively, if the operator selects, upon the display of the main menu of block 174, to generate work orders, the host computer 24 determines if the operator wishes to generate work orders by property or by problem as shown in blocks 267, 268 and 270. If the operator desires to produce work orders by property, the sorting means 27 sorts the inspection data associated with the selected property which relates to repairs or other maintenance work which has not been completed. The host computer then generates work orders which identify all outstanding items within the predetermined property which must be repaired or replaced as illustrated in blocks 272 and 274. Alternatively, if the operator elects to generate a work order based upon a predetermined type of problem, the sorting means sorts the inspection data to identify each occurrence of the predetermined type of problem as well as the property at which the problems occur. The host computer then generates one or more work orders which identify all properties which require repair or replacement to correct the predetermined type of problem, such as painting, as shown in blocks 276 and 278.

Still further, upon presentation of the main menu of block 174, the operator can select to access the configuration menu as shown in block 280. The host computer 24 then displays a selection menu which includes a number of different items relating, in general, to the configuration of the data processing system 25 which the operator can revise as shown in block 282. For purposes of illustration, data relating to each of these system configuration items can be stored in a system configuration data file 28c within the host memory means 28. Prior to an inspection, the appropriate data from the system configuration data file can be downloaded to the property inspection data entry device 10 such that the property inspection data entry device provides the appropriate prompts and is adapted to receive the designated responses.

In particular, the operator can revise the question list which outlines the questions or prompts which are provided to the property inspection data entry device 10 and which are, in turn, presented to the operator during the inspection process as shown in blocks 284-288. Alternatively, the operator can access either the checkpoint list which enumerates the different features, such as rooms, to be inspected during an inspection of a property, such as a rental unit, or the item list which identifies the specific items, such as refrigerators or stoves, which are to be inspected, as illustrated in blocks 290-300.

In addition, the operator can edit the response list which identifies the appropriate responses to the various questions posed during the inspection process or the appliance list which identifies the various appliances within a predetermined property or rental unit, as shown in blocks 302-312. The operator can also edit the property information or system information as shown in blocks 314-324. Finally, the operator can clean the configuration data, as shown in blocks 326-330, by packing the data file to more efficiently utilize the host memory means 28.

As illustrated, the host computer 24, in each of these instances, determines if the operator is authorized to edit the selected type of list. If properly authorized, the operator can then edit the selected list. Upon completion of the editing of the configuration data, the host computer again displays the main menu as shown in block 174.

Finally, the operator can elect to access the maintenance menu which displays a list of various maintenance options. As illustrated in blocks 332 and 334, these maintenance options can include index, clean, zap, repair and exit. Once the operator has selected the desired maintenance option, the host computer 24 determines if the operator is authorized to access the selected maintenance option, and reconfirms the selection of the operator. More particularly, if the operator has selected the "index" option, a new and/or updated index file for current database files within the host memory means 28 is generated as shown in blocks 336–342. Alternatively, if the operator has selected the "clean" option, all deleted data is removed from the host memory means and the selected data files are packed to achieve better utilization of the host memory means as shown in blocks 344–350. In addition, if the operator has selected the "zap" option, the data files designated by the operator are cleared as shown in blocks 352–358. However, the host memory means typically includes backup data files 28d in which a duplicate set of data is stored. Thus, if the "repair" option is selected, the backup data files are accessed to generate new files such that host computer can replicate data files which have been inadvertently deleted as shown in blocks 360–366.

Although the property inspection data entry device 10 of the present invention has been described above in conjunction with the inspection of one or more rental units, such as apartments, the property inspection data entry device can be employed to inspect a wide variety of properties, including both the interior and exterior of those properties. For example, the property inspection data entry device can be employed to inspect the exterior surfaces and the surroundings of one or more buildings as shown in FIG. 3. Likewise, the property inspection data entry device can be employed to inspect the common areas, such as the pool, the clubhouse and the laundry facilities, of a rental property. In each of these instances, the property inspection data entry device operates according to the method described above to collect data regarding the inspection, such as the relative condition of the building, the common areas or one or more features thereof, such as the stairwells or railings. The property inspection data entry device can also prompt the operator to inspect a number of predetermined features of the property or to inspect additional properties in the manner described above.

Figure 8:
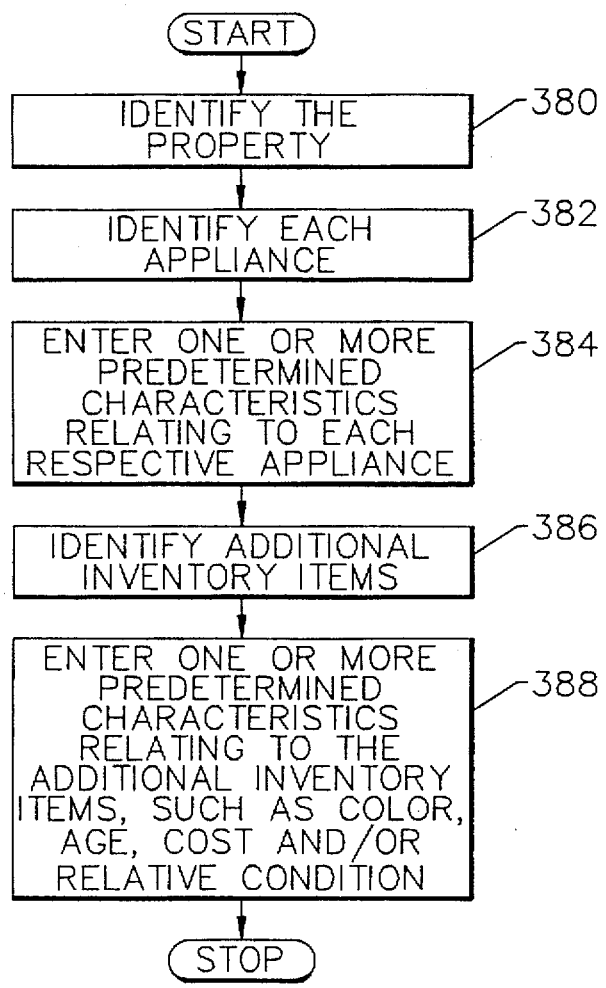
FIG. 8 is a flow chart illustrating the operations performed during an inventory of the assets, such as the appliances, disposed at various locations about a property.
Figure 9A:
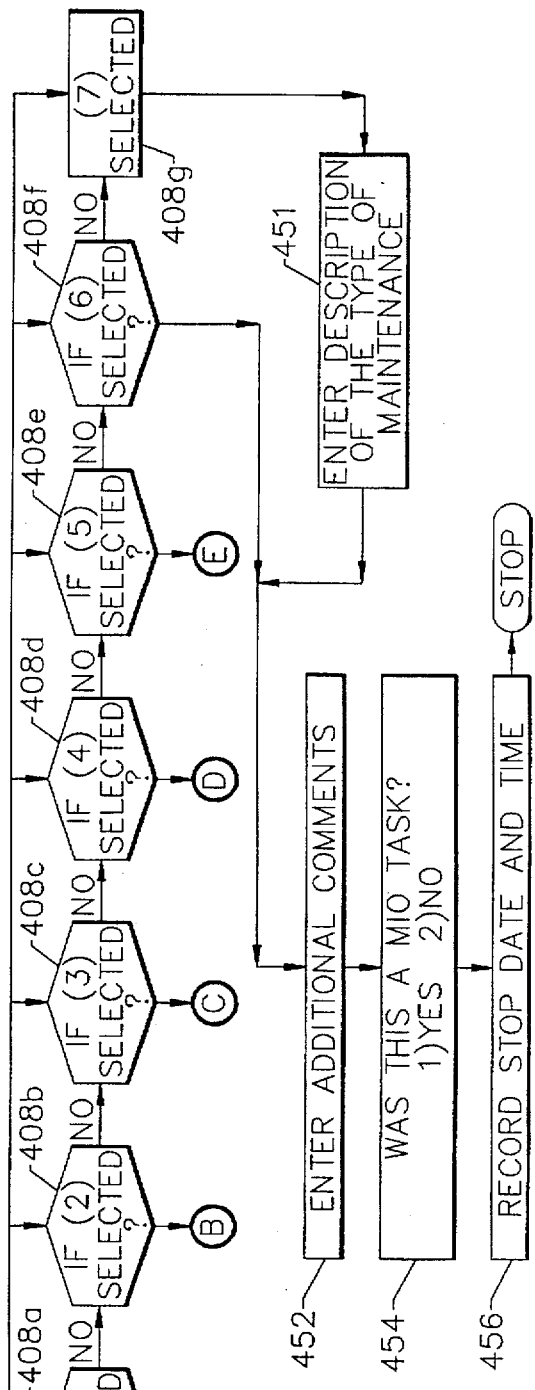
Figure 9A:
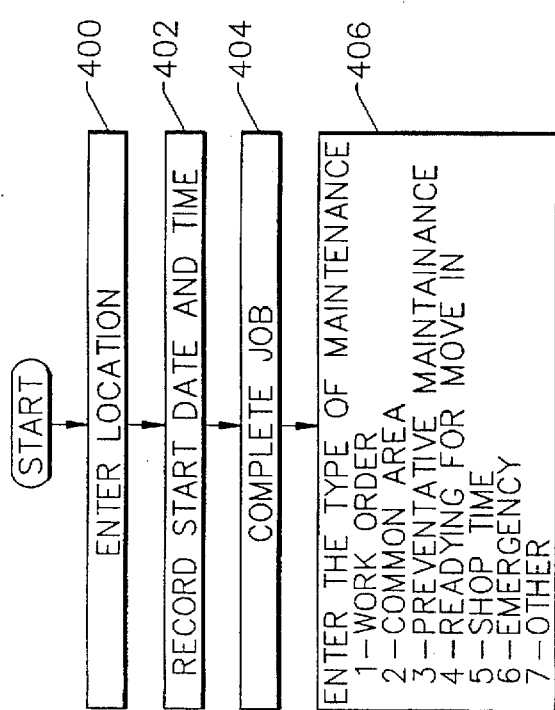
Figure 9B:
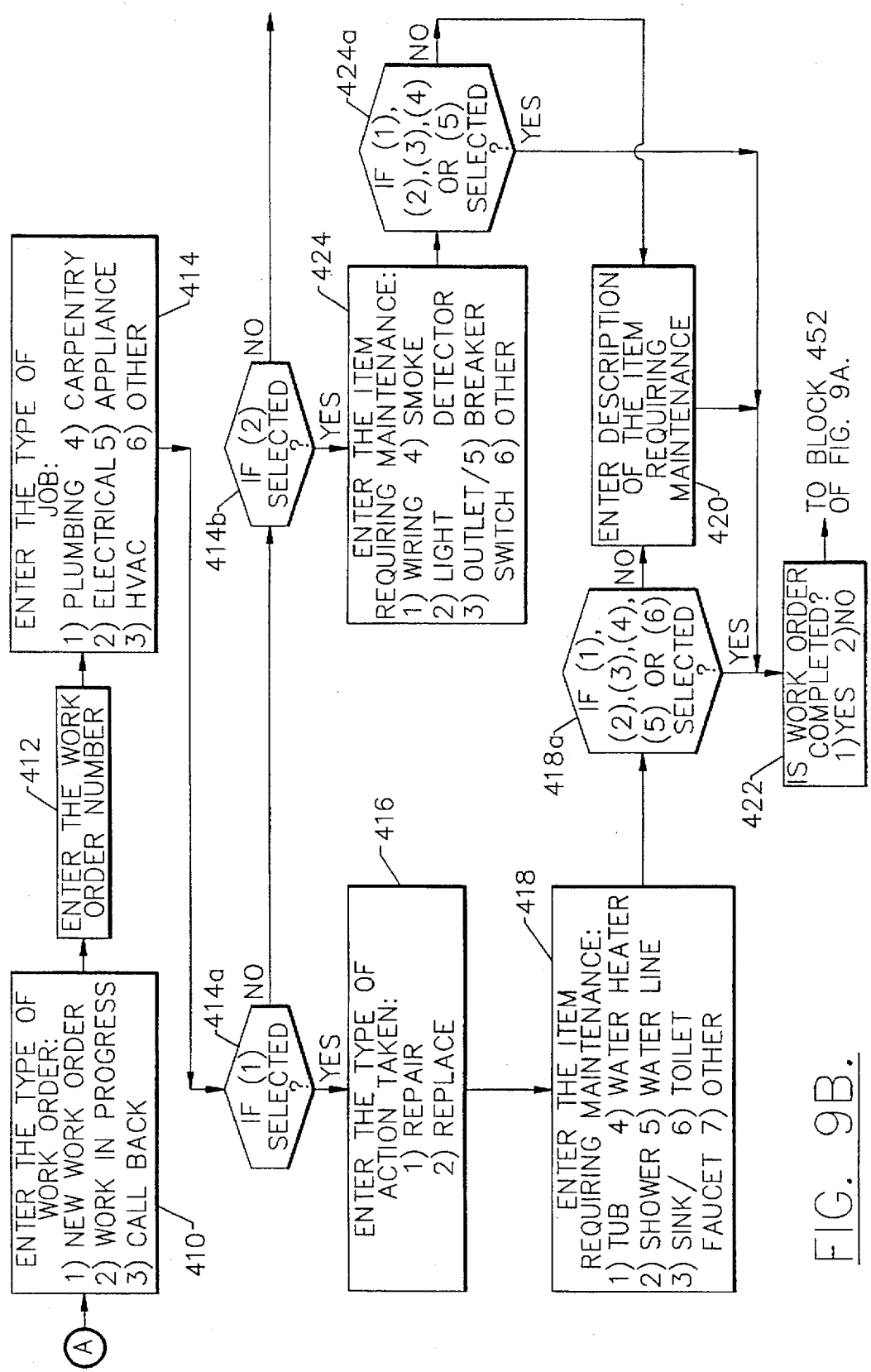
Figure 9C:
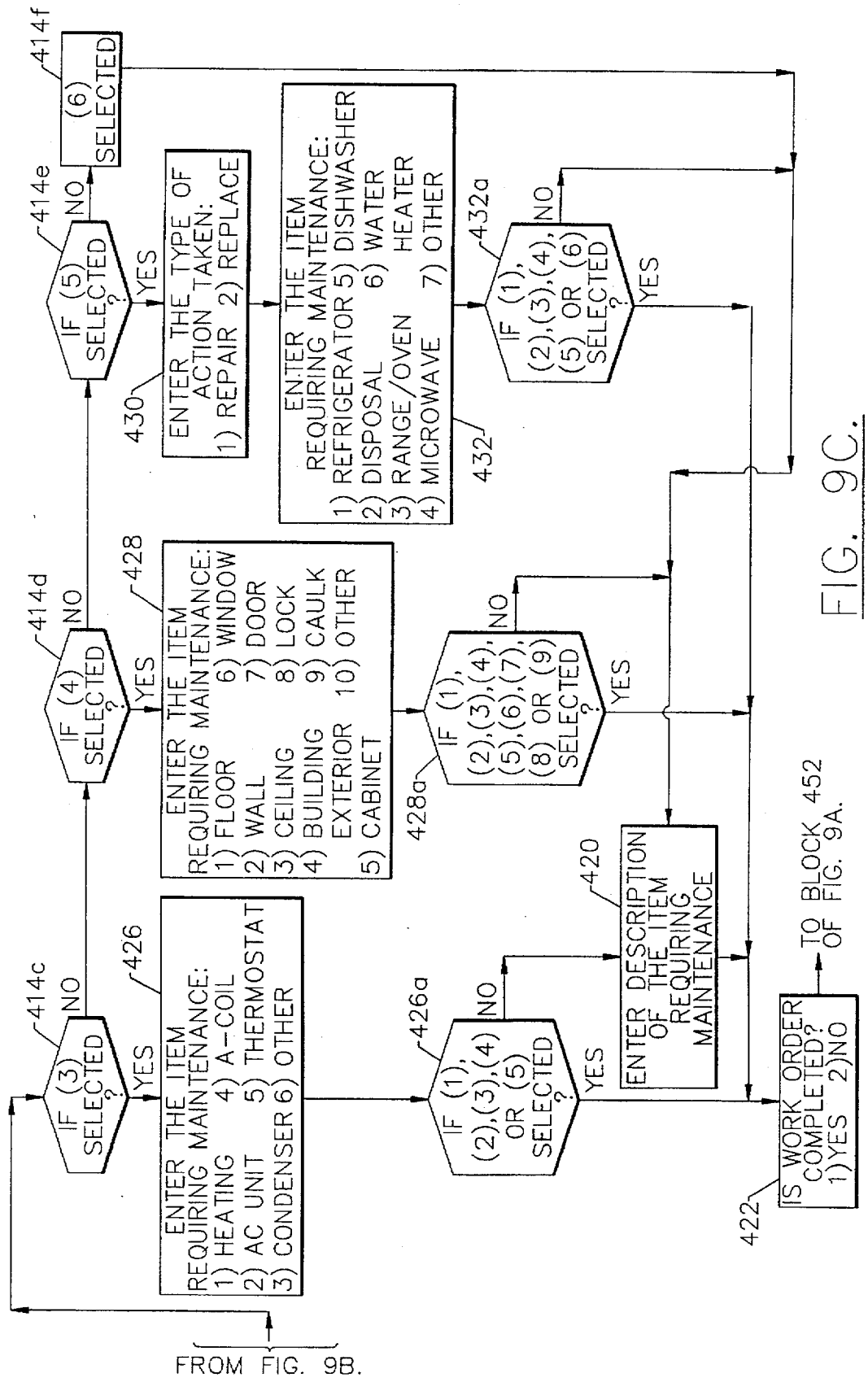
Figure 9D:
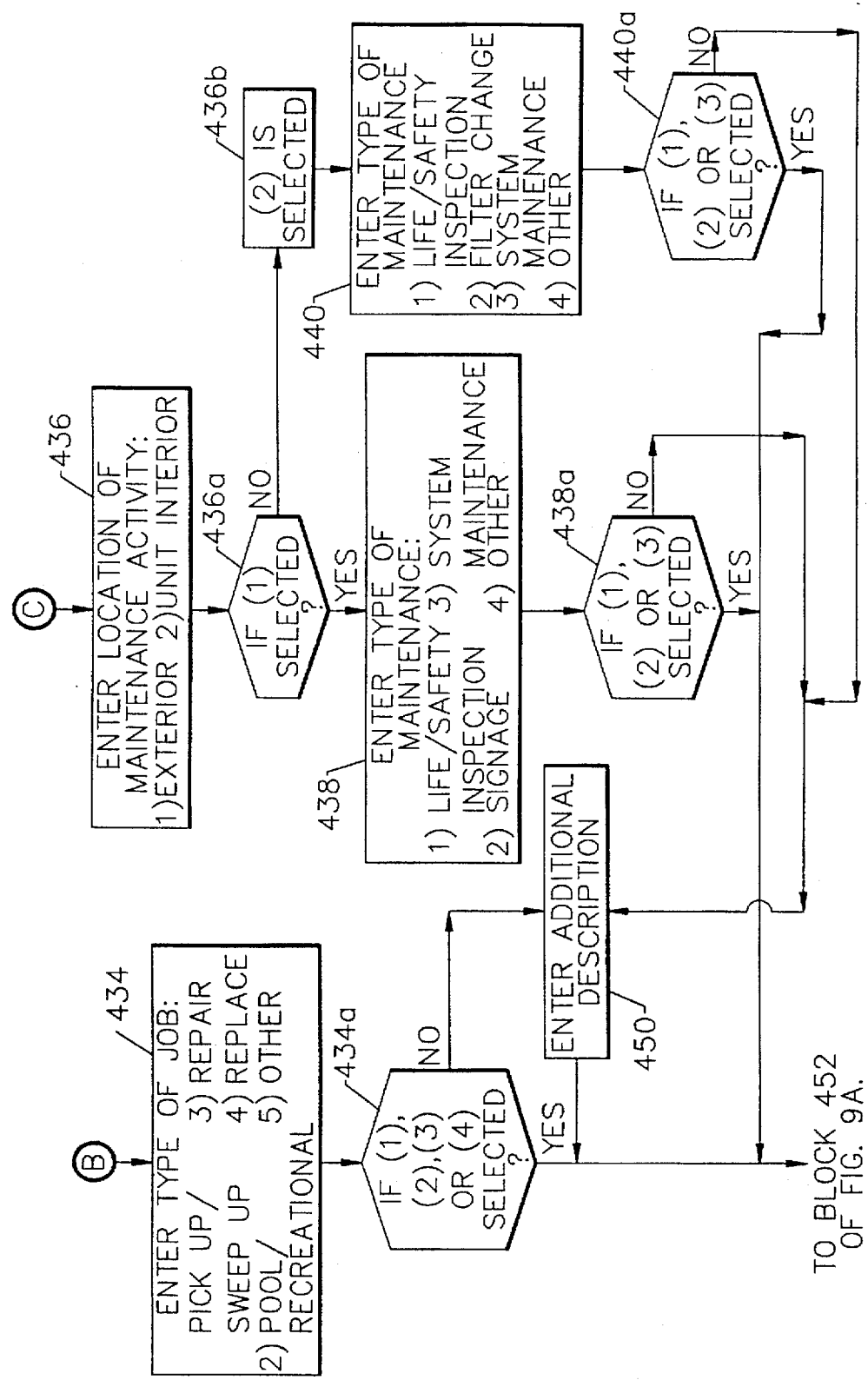

As illustrated in FIG. 8, the property inspection data entry device 10 can also be employed to conduct an inventory of the various assets located about a property. For example, the property inspection data entry device can collect inventory data identifying and describing the various assets located about a property. More particularly, the property inspection data entry device can collect inventory data identifying and describing one or more characteristics of the appliances within each of the rental units or apartments of an apartment complex, for example. The inventory data can be stored in an inventory data file 18c within the memory means 18 of the property inspection data entry device.

According to this embodiment of the present invention and as shown in block 380, the property inspection data entry device 10 initially identifies the property, such as by reading or scanning the label associated with the property which includes indicia which identifies the property. Alternatively, the operator may identify the property by entering the property designation via the data entry means 16. Thereafter, the property inspection data entry device can collect inventory data identifying each of the appliances by scanning the label associated with each of the appliances which includes indicia identifying the respective appliance, as shown in block 382.

The property inspection data entry device 10 then prompts the operator to enter additional predetermined types of inventory data relating to the appliance. This additional inventory data can include, for example, the relative condition of the appliance, the color of the appliance, the age of the appliance, the replacement cost of the appliance or any other parameter of interest as shown in block 384. Typically, the configuration data which has been downloaded into the property inspection data entry device includes the most common selections or choices for the additional inventory data. For example, the configuration data may indicate that the color of the appliances is typically white or black. Thus, the operator can enter the additional inventory data based upon the selections provided by the configuration data or the operator can enter additional types of inventory data which has not been predefined, such as via the data entry means 16. The property inspection data entry device can then prompt the operator to inventory any additional assets located about the property as shown in blocks 386 and 388.

Once the assets located about the property have been inventoried and the inventory data identifying the assets and one or more characteristics relating to the assets has been collected by the property inspection data entry device 10, the inventory data can be transferred to a host computer 24 and, more particularly, to an inventory data file 28e within the host memory means 28 of the host computer. The host computer can thereafter process and sort the data as desired. The host computer can also print one or more inventory reports based upon the inventory data collected by the property inspection data entry device in order to assist property management personnel in evaluating the assets and anticipating the repair and replacement of the assets.

As described above, the data processing system 25 and method of the present invention provides for the efficient and reliable compilation of inspection data relating to the contents and condition of a variety of properties, such as rental units, common areas and the exteriors and surroundings of buildings. In addition, the data processing system and method provides for customized processing of the inspection data such that reports and work orders can be generated based upon predetermined parameters. Further, one embodiment of the data processing system and method of the present invention includes a property inspection data entry device 10 for prompting the operator during the inspection of the property to specifically inspect certain predetermined features or characteristics of the property such that a more complete and reliable inspection is performed in a timely and accurate manner.

The data processing system 25 of another aspect of the present invention includes a maintenance data entry device 10 for compiling maintenance data during the maintenance of a property. As described above in conjunction with the property inspection data entry device, the maintenance data entry device can be employed in conjunction with the maintenance of a variety of properties, such as rental units or apartments, the common areas of rental properties or the exterior surfaces and surroundings of one or more buildings, without departing from the spirit and scope of the present invention.

The maintenance data entry device 10 includes reader means 12 for identifying the property undergoing maintenance. In one embodiment, the reader means is a scanner responsive to one or more labels, such as barcode labels, associated with the property. As described above, the labels can include indicia relating to the property, such as indicia which identifies or provides the designation of the property. The maintenance data entry device also includes data entry means 16, such as a keyboard, for receiving maintenance data relating to the maintenance performed on the identified property. Typically, the data entry means is responsive to actuation by the operator of the maintenance data entry device such that the operator can input additional data during or upon completion of the maintenance operations. Further, the maintenance data entry device includes memory means 18 for storing the maintenance data, such as in a maintenance data file 18d. The types of maintenance data collected and stored by the maintenance data entry device of this embodiment of the present invention will be described in more detail below in conjunction with a description of the detailed operations of the maintenance data entry device.

According to one embodiment, the maintenance data entry device 10 can also include a timer 21 for determining the time at which the maintenance was performed. For example, the timer can determine the date and time at which the maintenance was begun, such as by determining the date and time at which the property undergoing maintenance was identified. In one embodiment, the timer can determine the date and time at which the label associated with the property was read. In addition, the timer can determine the date and time at which the maintenance is completed. Accordingly, the time required to complete the maintenance activity can be determined and can be utilized by property management personnel to efficiently assign and allocate maintenance activities to the maintenance personnel.

The maintenance data entry device 10 can also include prompting means 23 for guiding the operator of the maintenance data entry device during entry of the maintenance data. Thus, upon completion of the maintenance activities, the maintenance data entry device and, more particularly, the prompting means can prompt the operator to enter predetermined types of maintenance data relating to the property as described in detail below. Further, the maintenance data entry device can include a controller 22 for controlling the operations of the maintenance data entry device.

As described above in conjunction with the property inspection data entry device, the maintenance data entry device 10 can be operably connected to a host computer 24 in order to transfer the maintenance data collected during the various maintenance activities to the host computer and, more particularly, to the maintenance data file 28f of the host memory means 28. Thus, the maintenance data entry device preferably includes data transfer means 32 for establishing a communication path with the host computer and for transferring the maintenance data from the memory means 18 of the maintenance data entry device to the host computer following the maintenance of a property via the communication path.

As also described above, the host computer 24 can then process the maintenance data, such as by sorting the data according to one or more parameters. For example, the maintenance data can be sorted based upon the type of maintenance activity, based upon the length of time required to complete the maintenance activity or based upon the property undergoing the maintenance activity. The host computer can also generate one or more reports based upon the maintenance data. Accordingly, the property management personnel can obtain maintenance reports sorted according to one or more predetermined parameters. Based on these reports, property management personnel can plan and schedule maintenance activities in a more orderly fashion. In addition, property management can determine which properties, such as which rental units and, more particularly, which assets within the rental units are requiring the most or an increasing amount of maintenance. Accordingly, the properties or the assets at those properties which require the most or an increasing amount of maintenance can be repaired or replaced in order to reduce maintenance costs. The host computer of this embodiment of the present invention can also generate reports which track the time spent by maintenance personnel to complete the various maintenance activities in order to determine if the maintenance personnel are properly utilized.

In order to more fully describe the operations performed by the maintenance data entry device 10, FIGS. 9A–9E provide flow charts describing the detailed operations thereof. As shown in block 400, the maintenance data entry device initially identifies the property undergoing maintenance, such as by the location or other description of the property. Typically, the maintenance data entry device and, more particularly, the reader means 12 reads or scans a label associated with the property which includes indicia identifying the property. Alternatively, the operator of the maintenance data entry device can enter the location or other identification of the property undergoing maintenance, such as via the data entry means 16. As shown in block 402, the maintenance data entry device and, more particularly, the timer 21 preferably determines the date and time at which the maintenance activity is begun, such as by determining the date and time at which the property undergoing maintenance is identified by the maintenance data entry device. The operator of the maintenance data entry device then performs the required maintenance activities within the property as shown in block 404.

Upon completion of the maintenance activity, the maintenance data entry device 10 and, more preferably, the prompting means 23 of the maintenance data entry device prompts the operator to enter several predetermined types of maintenance data describing the maintenance activities performed. As shown in block 406, the maintenance data entry device initially prompts the operator to identify the type of maintenance activity which was performed. As shown, exemplary maintenance activities include responding to a work order, maintaining a common area, conducting preventive maintenance, readying a property to be leased to a new tenant, working in a shop or performing emergency services. If the maintenance data entry device does not list the type of maintenance activity which was performed, the operator can enter a description of the maintenance activity as shown in blocks 408g and 451.

If the operator was responding to a work order in conducting the maintenance activities, the maintenance data entry device 10 prompts the operator to enter the type of work order, such as a new work order, a work-in-progress or a call back, as well as the work order number, as shown in blocks 408a, 410 and 412. As described above, the work orders may also be generated by the data processing system 25 of the present invention based upon the inspection data collected by the property inspection data entry device. Thus, the data processing system can efficiently collect and process both the inspection data from which the work orders are generated and the maintenance data which provides information collected by the maintenance personnel in responding to the work orders.

Once the operator has identified the type of work order, the maintenance data entry device 10 prompts the operator to identify the general type of job which was performed. As shown in block 414, the types of jobs can include plumbing, electrical, HVAC, carpentry, appliance repair as well as other types of jobs as described by the operator.

If the maintenance activity involved plumbing as shown in block 414a, the maintenance data entry device 10 prompts the operator to identify the type of action taken in performing the maintenance activity, such as the repair or replacement of a component of the plumbing system as shown in block 416. Thereafter, the maintenance data entry device prompts the operator to enter the particular component or fixture which required maintenance. For example, the component or fixture requiring maintenance may be a tub, a shower, a sink, a faucet, a water heater, a water line, a toilet or other types of plumbing component for which the operator can enter a description as shown in blocks 418, 418a and 420. Thereafter, the maintenance data entry device determines if the work order has been completed as shown in block 422.

If the operator of the maintenance data entry device 10 identifies the maintenance activity as requiring electrical, HVAC or carpentry work as shown in blocks 414b, 414c or 414d, respectively, the maintenance data entry device prompts the operator to enter the particular item requiring maintenance. As shown in block 424, typical electrical items requiring maintenance include wiring, lighting, outlets, switches, smoke detectors and breakers. As shown in block 426, typical HVAC items requiring maintenance include the heating unit, the air conditioning unit, condensers, A-coil and T-stat. Further, typical items requiring carpentry work include flooring, walls, ceilings, the exterior surfaces of buildings, cabinets, windows, doors, locks and caulking as shown in block 428. As illustrated in blocks 424a, 426a and 428a, if the type of item requiring maintenance is not listed by the maintenance data entry device, the operator can enter a description of the item requiring maintenance, such as via the data entry means 16, as shown in block 420. The maintenance data entry device then prompts the operator to identify whether the work order has been completed as shown in block 422.

If the maintenance activity involves an appliance as shown in block 414e, the maintenance data entry device 10 prompts the operator to identify whether the appliance was repaired or replaced, as shown in block 430. The maintenance data entry device also prompts the operator to identify the particular appliance requiring maintenance, such as the refrigerator, the garbage disposal, the range or oven, the microwave, the dishwasher or the water heater as shown in block 432. As described above and as shown in blocks 432a and 420, the operator can also enter the description of another type of appliance, if the appliance requiring maintenance is not listed. The maintenance data entry device then prompts the operator to identify whether the work order has been completed as shown in block 422.

If the maintenance activity did not involve responding to a work order, but, instead, involved maintaining a common area as shown in block 408b, the maintenance data entry device 10 prompts the operator to identify the type of maintenance performed, such as picking up or sweeping, maintenance activities involving the pool or recreational areas, repair of items within the common area, replacement of items within the common area or other types of maintenance activities within the common area, as shown in blocks 434 and 434a. If the maintenance activity involved preventive maintenance activities as shown in block 408c, the maintenance data entry device prompts the operator to identify the location at which the maintenance activity was performed, such as on the exterior or within the interior of a building, and to identify the type of maintenance performed, as shown in blocks 436, 436a, 436b, 438, 438a, 440 and 440a. In particular, the preventive maintenance activities can include safety inspections, signage repairs, system maintenance, filter changes or other types of preventive maintenance activities.

If the maintenance activities were performed in order to ready the property for leasing to a new tenant as shown in block 408d, the maintenance data entry device 10 prompts the operator to enter the relative state of readiness of the property, such as whether the maintenance activities are ongoing or have been completed, as shown in blocks 442 and 442a. If the maintenance activities have been completed, the maintenance data entry device prompts the operator to identify whether the property is suitable for leasing as shown in block 444. If the maintenance activities are continuing, however, the maintenance data entry device prompts the operator to identify the type of additional repairs which are required in order to ready the property for leasing to the new tenant. For example, the property may require cleaning, additional repairs or replacements, painting, caulking, system or appliance maintenance, carpet cleaning or replacement, or other types of maintenance, as shown in blocks 446 and 446a. Alternatively, if the maintenance activity involves working in a shop as shown in block 408e, the maintenance data entry device 10 prompts the operator to identify the type of shop activity, such as the ordering and organization of materials, the pickup of materials, attending a meeting, being away at another location or other types of shop activities as shown in blocks 448 and 448a. As shown in FIGS. 9A-9E, if the type of maintenance performed is not listed by the maintenance data entry device 10, the maintenance data entry device prompts the operator to enter a description of the maintenance activity, such as via the data entry means 16, as shown in blocks 449-451.

If the maintenance activity involves providing emergency services as shown in block 408f or once the type of maintenance has been described by the operator in response to the prompts provided by the maintenance data entry device 10, the maintenance data entry device prompts the operator to enter any additional comments and to identify if the maintenance activity as shown in block 452. In addition, if the configuration data stored within the maintenance data entry device indicates that one or more of the maintenance tasks may involve an MIO task, the maintenance data entry device prompts the operator to identify if the most recently completed maintenance activity was an MIO task as shown in block 454. The maintenance data entry device and, more particularly, the timer 21 also preferably records the date and time at which the maintenance activities were completed as shown in block 456. Accordingly, the maintenance data entry device and, more specifically, the controller 22 can determine the elapsed time which was required to complete the maintenance activity.

As described above, the maintenance data entry device 10 efficiently collects and stores the maintenance data in an accurate and timely fashion. This maintenance data includes data representative of the property undergoing maintenance, the date and time at which the maintenance was begun and completed, and the responses of the operator to the various prompts posed by the maintenance data entry device and, more particularly, by the prompting means 23. Upon completion of maintenance activities at one or more of the properties, the maintenance data entry device can be operably connected to a host computer 24 and the maintenance data can be transferred to the host computer for subsequent processing and sorting.

Accordingly, the host computer 24 can produce reports based upon the maintenance data to assist the property management personnel. In particular, the maintenance data and, more specifically, the reports based upon the maintenance data can assist property management personnel to assign and allocate maintenance activities in an efficient manner. The maintenance data can also assist property management personnel to determine the utilization of the various maintenance personnel and to determine the maintenance costs associated with upkeep and repair of the various properties as well as the assets located about the various properties. Accordingly, the properties can be more efficiently maintained based upon the maintenance data collected by the data entry device 10 of the present invention.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A property inspection data entry device for compiling inspection data during the inspection of a property, wherein said inspection data includes data relating to the relative condition of the property, and wherein the property inspection data entry device comprising:

reader means, responsive to one or more labels associated with the property which includes indicia representative of predetermined characteristics of the property, for receiving inspection data relating to the predetermined characteristics of the property;

data entry means, responsive to actuation by an operator of the property inspection data entry device, for receiving additional inspection data relating to the property including data relating to the relative condition of the property;

memory means, responsive to both said reader means and said data entry means, for storing the inspection data relating to the property received by both said reader means and said data entry means; and controller means, responsive to said reader means and said data entry means, for identifying data relating to the relative condition of the property which fails to meet a predetermined criteria.

2. A property inspection data entry device according to claim 1 wherein said reader means is responsive to a label associated with the property which includes indicia representative of predetermined physical characteristics of the property.

3. A property inspection data entry device according to claim 1 wherein the property is a rental unit, and wherein said reader means is responsive to one or more labels associated with respective items within the rental unit and which include indicia representative of predetermined physical characteristics of the respective items within the rental unit.

4. A property inspection data entry device according to claim 1 wherein the property is a rental unit, and wherein said reader means is responsive to both a label associated with the rental unit which includes indicia representative of predetermined physical characteristics of the rental unit, and one or more labels associated with respective items within the rental unit and which include indicia representative of predetermined physical characteristics of the respective items within the rental unit.

5. A property inspection data entry device according to claim 1 further comprising prompting means for guiding the operator of said property inspection data entry device during inspection of the property, wherein the operator enters the inspection data relating to the rental unit in response to a prompt provided by said prompting means.

6. A property inspection data entry device according to claim 5 further comprising display means, responsive to said memory means, for displaying the inspection data relating to the predetermined characteristics of the property.

7. A property inspection data entry device according to claim 1 wherein said reader means comprises a scanner responsive to one or more labels, associated with the property, which include indicia representative of predetermined characteristics of the property.

8. A property inspection data entry device according to claim 1 wherein said data entry means comprises a keypad having a plurality of keys, responsive to actuation by the operator of said property inspection data entry device, for receiving inspection data relating to the property.

9. A property inspection data entry device according to claim 1 further comprising:

a controller, responsive to said data entry means and said reader means, for controlling operations of the property inspection data entry device, and data transfer means, responsive to said controller, for establishing a communication path with a host computer, and for transferring the inspection data from said memory means to the host computer following the inspection of a property via the communication path.

10. A property inspection data processing system for processing inspection data collected during the inspection of at least one property, the data processing system comprising:

a host computer for processing inspection data collected from the inspection of at least one property, wherein said host computer includes sorting means for arranging the inspection data relating to the property according to at least one predetermined characteristic of the property; and a property inspection data entry device for compiling inspection data during the inspection of a property, the property inspection data entry device comprising:

reader means, responsive to one or more labels associated with the property which include indicia representative of predetermined characteristics of the property, for receiving inspection data relating to the predetermined characteristics of the property;

data entry means, responsive to actuation by an operator of the property inspection data entry device, for receiving inspection data relating to the property;

memory means, responsive to both said reader means and said data entry means, for storing the inspection data relating to the property received by both said reader means and said data entry means; and data transfer means for transferring the inspection data from said memory means of said property inspection data entry device to said host computer following the inspection of a property and upon the establishment of a communication path therebetween.

11. A property inspection data processing system according to claim 10 wherein said host computer comprises:

a host controller for controlling the operations of said host computer;

host memory means, responsive to said host controller, for storing the inspection data collected during the inspection of at least one property; and interface means, responsive to said host controller, for establishing a communication path with said data transfer means of said property inspection data entry device.

12. A property inspection data processing system according to claim 10 wherein said host computer comprises output means for generating a report relating to the inspection data.

13. A property inspection data processing system according to claim 10 wherein said reader means of said property inspection data entry device is responsive to a label associated with the property which includes indicia representative of predetermined physical characteristics of the property.

14. A property inspection data processing system according to claim 10 wherein the property is a rental unit, and wherein said reader means of said property inspection data entry device is responsive to one or more labels associated with respective items within the rental unit and which include indicia representative of predetermined physical characteristics of the respective items within the rental unit.

15. A property inspection data processing system according to claim 10 wherein the property is a rental unit, and wherein said reader means of said property inspection data entry device is responsive to both a label associated with the rental unit which includes indicia representative of predetermined physical characteristics of the rental unit, and one or more labels associated with respective items within the rental unit and which include indicia representative of predetermined physical characteristics of the respective items within the rental unit.

16. A property inspection data processing system according to claim 10 wherein said property inspection data entry device further comprises prompting means for guiding the operator of said property inspection data entry device during inspection of the property, wherein the operator enters the inspection data relating to the property in response to a prompt provided by said prompting means.

17. A property inspection data processing system according to claim 10 wherein said reader means of said property inspection data entry device comprises a scanner responsive to one or more labels, associated with the property, which include indicia representative of predetermined characteristics of the property.

18. A property inspection data processing system according to claim 10 wherein said inspection data includes data relating to the relative condition of the property, and wherein the property inspection data entry device further comprises controller means, responsive to said data entry means, for identifying data relating to the relative condition of the property which fails to meet a predetermined criteria, and for indicating to said host computer said identified inspection data via said interface means.

19. A property inspection method for compiling inspection data from an inspection of a property, the property inspection method comprising the steps of:
   reading at least one label associated with the property, wherein the at least one label includes inspection data relating to the predetermined characteristics of the property;
   entering additional inspection data relating to the property, wherein said entering step comprises the step of manually entering data relating to the relative condition of the property;
   identifying data relating to the relative condition of the property which fails to meet a predetermined criteria; and
   storing the inspection data relating to the property obtained from said reading and entering steps.

20. A property inspection method according to claim 19 wherein the property is a rental unit, and wherein said reading step comprises the step of reading one or more labels associated with respective items within the rental unit and which include indicia representative of predetermined physical characteristics of the respective items within the rental unit.

21. A property inspection method according to claim 19 wherein the property is a rental unit, and wherein said reading step comprises the steps of:
   reading a label associated with the rental unit which includes indicia representative of predetermined physical characteristics of the rental unit; and
   reading one or more labels associated with respective items within the rental unit and which include indicia representative of predetermined physical characteristics of the respective items within the rental unit.

22. A property inspection method according to claim 19 further comprising the step of prompting an operator during the inspection of the property of predetermined characteristics of the property which should be inspected.

23. A property inspection method according to claim 19 wherein said reading step comprises the step of scanning at least one label associated with the property which includes indicia representative of predetermined characteristics of the property.

24. A property inspection method according to claim 19 further comprising the step of displaying the stored inspection data for review by an inspector during the inspection of the property.

25. A property inspection method according to claim 19 further comprising the step of processing the inspection data collected during the inspection of the property following the inspection.

26. A property inspection method according to claim 25 further comprising the steps of:
   transferring the stored inspection data to a host computer following the inspection of the property;
   storing the inspection data collected from the inspection of the property and transferred to the host computer in host memory means of the host computer.

27. A property inspection method according to claim 26 further comprising the step of sorting the inspection data relating to the property and stored in the host memory means according to at least one predetermined parameter.

28. A property inspection method according to claim 26 further comprising the step of generating a report relating to the inspection data stored in the host memory means.

29. A maintenance data entry device for compiling maintenance data during the maintenance of a property, the maintenance data entry device comprising:
   reader means for reading one or more labels associated with the property which include indicia relating to the property upon commencing maintenance activities and upon completing maintenance activities;
   a timer, responsive to said reader means, for determining a start time at which the maintenance commences and an end time at which the maintenance is completed;
   data entry means, responsive to actuation by an operator of the maintenance data entry device, for receiving maintenance data relating to the maintenance performed on the identified property; and
   memory means, responsive to both said reader means and said data entry means, for storing the maintenance data relating to the property received by both said reader means and said data entry means.

30. A maintenance data entry device according to claim 29 further comprising prompting means for guiding the operator of said maintenance data entry device during entry of the maintenance data, wherein the operator enters the maintenance data relating to the property in response to a prompt provided by said prompting means.

31. A maintenance data entry device according to claim 29 wherein said reader means comprises a scanner responsive to one or more labels, associated with the property, which identify the property undergoing maintenance.

32. A maintenance data entry device according to claim 29 wherein said data entry means comprises a keypad having a plurality of keys, responsive to actuation by the operator of said maintenance data entry device, for receiving maintenance data relating to the maintenance performed on the property.

33. A maintenance data entry device according to claim 29 further comprising:

a controller, responsive to said data entry means and said reader means, for controlling operations of the maintenance data entry device, and data transfer means, responsive to said controller, for establishing a communication path with a host computer, and for transferring the maintenance data from said memory means to the host computer following the maintenance of a property via the communication path.

34. A method for compiling maintenance data during maintenance of a property, the method comprising the steps of:

reading at least one label associated with the property upon commencing maintenance activities and upon completing maintenance activities, wherein the at least one label includes indicia identifying the property undergoing maintenance;

determining a start time at which the maintenance commences and an end time at which the maintenance is completed;

receiving maintenance data relating to the maintenance performed on the identified property; and storing the maintenance data relating to the property.

35. A method according to claim 34 further comprising the step of prompting an operator during the maintenance of the property to enter the maintenance data.

36. A method according to claim 34 wherein said reading step comprises the step of scanning at least one label associated with the property which identify the property undergoing maintenance.

37. A method according to claim 34 further comprising the step of processing the maintenance data collected during said receiving step.

38. A method according to claim 37 further comprising the steps of:

transferring the stored maintenance data to a host computer following the maintenance of the property;

storing the maintenance data collected during said receiving step and transferred to the host computer in host memory means of the host computer.

39. A method according to claim 38 further comprising the step of sorting the maintenance data relating to the property and stored in the host memory means according to at least one predetermined parameter.

40. A method according to claim 38 further comprising the step of generating a report relating to the maintenance data stored in the host memory means.

* * * * *